(12) United States Patent
Duby

(10) Patent No.: US 8,133,397 B2
(45) Date of Patent: Mar. 13, 2012

(54) DISPLACEMENT FILTER METHOD

(76) Inventor: Sean R. Duby, Costa Mesa, CA (US)

( * ) Notice: Subject to any disclaimer, the term of this patent is extended or adjusted under 35 U.S.C. 154(b) by 0 days.

(21) Appl. No.: 12/901,765

(22) Filed: Oct. 11, 2010

(65) Prior Publication Data

US 2011/0084034 A1 Apr. 14, 2011

Related U.S. Application Data

(60) Division of application No. 11/018,400, filed on Dec. 20, 2004, now Pat. No. 7,811,454, which is a continuation of application No. 10/147,230, filed on May 15, 2002, now Pat. No. 6,833,071.

(51) Int. Cl.
*B01D 37/00* (2006.01)
(52) U.S. Cl. .......................... 210/741; 210/770; 210/797
(58) Field of Classification Search .................. 210/739, 210/767, 770, 771, 791, 797, 741; 100/37
See application file for complete search history.

(56) References Cited

U.S. PATENT DOCUMENTS

| | | |
|---|---|---|
| 317,855 A | 5/1885 | Ripley |
| 806,920 A | 12/1905 | Rossi |
| 999,759 A | 8/1911 | Dondey et al. |
| 1,672,659 A | 6/1928 | Sohler |
| 2,730,242 A | 1/1956 | Samuel |
| 3,347,386 A | 10/1967 | Kraissl, Jr. |
| 3,591,008 A | 7/1971 | Diefenbach |
| 3,687,287 A | 8/1972 | Gwilliam |
| 3,712,209 A | 1/1973 | Gwilliam |
| 3,713,382 A | 1/1973 | Gwilliam |
| 3,724,663 A | 4/1973 | Gwilliam |
| 3,753,498 A | 8/1973 | Gwilliam |
| 3,753,499 A | 8/1973 | Gwilliam |
| 3,756,142 A | 9/1973 | Gwilliam |
| 3,762,560 A | 10/1973 | Gwilliam |
| 3,782,554 A | 1/1974 | Gwilliam |
| 3,805,961 A | 4/1974 | Clark et al. |
| 3,837,498 A | 9/1974 | Ito |
| 3,974,074 A | 8/1976 | Purdey |
| 4,019,984 A | 4/1977 | Mohn |
| 4,116,831 A | 9/1978 | Keat |
| 4,146,485 A | 3/1979 | Broad |
| 4,172,037 A | 10/1979 | Golston |
| 4,214,991 A | 7/1980 | Broad |
| 4,300,277 A | 11/1981 | Clark |
| 4,334,996 A | 6/1982 | Broad |
| 4,366,055 A | 12/1982 | Gwilliam et al. |
| 4,447,327 A | 5/1984 | Clark |
| 4,496,459 A | 1/1985 | Rosaen |
| 4,507,201 A | 3/1985 | Wall et al. |

(Continued)

FOREIGN PATENT DOCUMENTS

CH 341797 A 10/1959

(Continued)

*Primary Examiner* — Matthew Savage
(74) *Attorney, Agent, or Firm* — Knobbe, Martens, Olson & Bear, LLP

(57) ABSTRACT

A method and apparatus for filtering a slurry utilizing a displacement filtering principle. The filter apparatus desirably includes an inner filter and an outer filter. Both the inner and outer filters are preferably substantially annular in shape and positioned concentrically with respect to each other. A particulate collection volume is at least partially defined between the inner and outer filter. The method includes directing a flow of slurry into the particulate collection volume under sufficient pressure to force fluid within the particulate collection volume through one of the inner and outer filters and any particulate matter blocking a filtering surface of the inner and outer filters.

13 Claims, 13 Drawing Sheets

U.S. PATENT DOCUMENTS

| | | |
|---|---|---|
| 4,514,298 A | 4/1985 | Wall et al. |
| 4,525,275 A | 6/1985 | Ostlund |
| 4,530,769 A | 7/1985 | Wolter et al. |
| 4,657,673 A | 4/1987 | Kessler |
| 4,725,356 A | 2/1988 | Zievers et al. |
| 4,767,534 A | 8/1988 | Ziller |
| 4,769,052 A | 9/1988 | Kowalski |
| 4,789,471 A | 12/1988 | Wall et al. |
| 4,909,937 A | 3/1990 | Hoffmann et al. |
| 5,139,672 A | 8/1992 | Ohbayashi |
| 5,154,825 A | 10/1992 | Kupka |
| 5,198,111 A | 3/1993 | Davis |
| 5,312,544 A | 5/1994 | Kinney |
| 5,344,565 A | 9/1994 | Degen et al. |
| 5,624,559 A | 4/1997 | Levin et al. |
| 5,804,072 A | 9/1998 | Yang |
| 6,180,002 B1 | 1/2001 | Higgins |
| 6,833,071 B2 | 12/2004 | Duby |

FOREIGN PATENT DOCUMENTS

| | | |
|---|---|---|
| DE | 3916745 A1 | 11/1990 |
| EP | 0827767 A | 3/1998 |
| FR | 2507496 A | 12/1982 |
| GB | 1477702 A | 6/1977 |

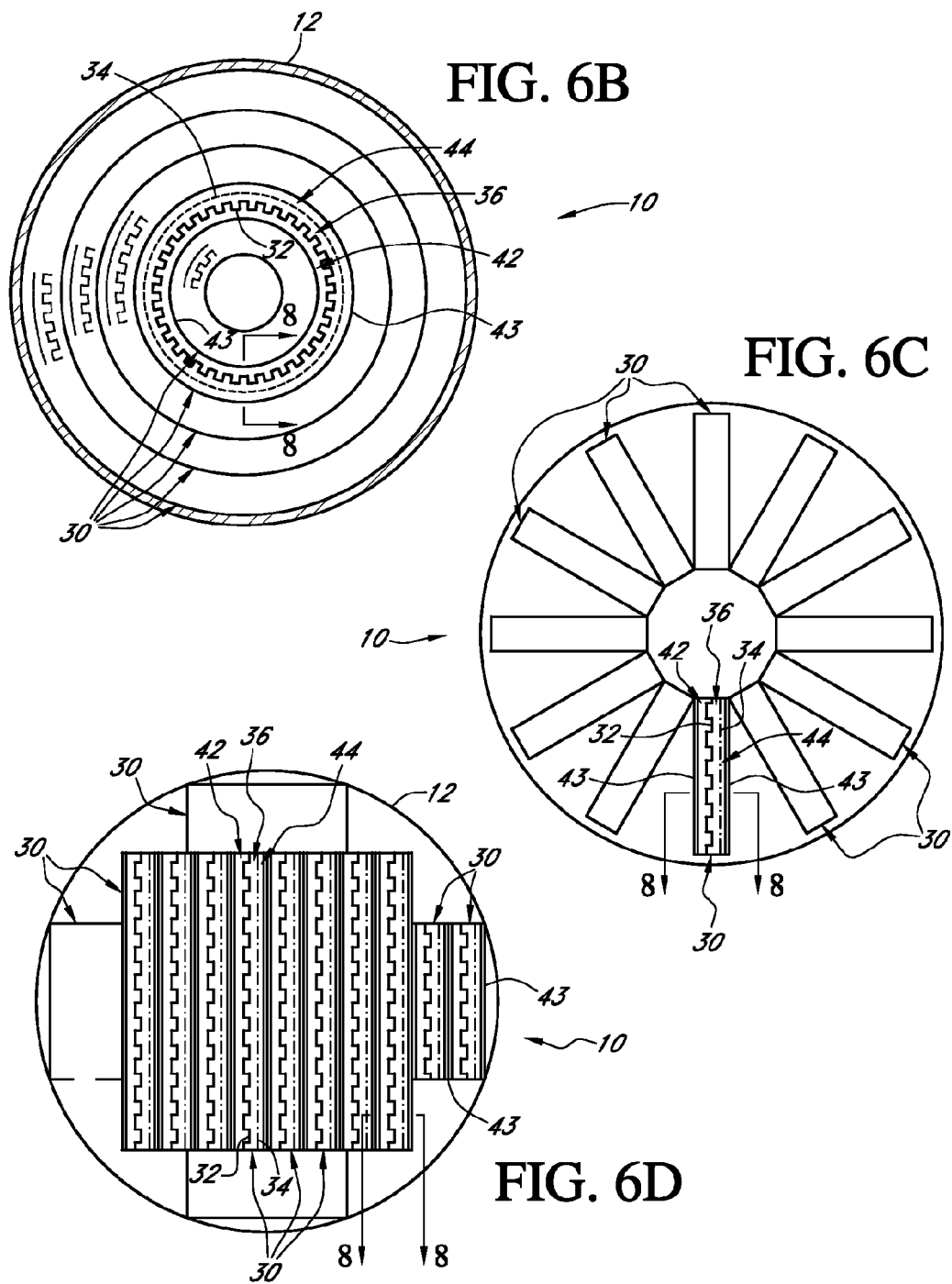

DISPLACEMENT FILTER METHOD

RELATED APPLICATIONS

This application is a divisional of U.S. patent application Ser. No. 11/018,400, filed Dec. 20, 2004, scheduled to issue as U.S. Pat. No. 7,811,454, which is a continuation of U.S. patent application Ser. No. 10/147,230, filed May 15, 2002, now U.S. Pat. No. 6,833,071, the entireties of which are hereby incorporated by reference herein and made a part of the present disclosure.

BACKGROUND OF THE INVENTION

1. Field of the Invention

The present invention relates to the filtering of particulate matter from a slurry. More specifically, the present invention relates to the filtering of slurries having a relatively high particulate content utilizing a displacement filtering principle.

2. Description of the Related Art

Separating the liquid and solid components of a liquid-solid mixture, or slurry, is a necessary or desirable process in many industries. In many filtering applications, the slurry is a waste product and it is desirable to separate the solid and liquid matter and dispose of them separately. Often, the solid component may be a hazardous material and the liquid component may be reused or recycled. In other applications, the liquid component may be the final product, such as in the wine industry, for example. In this application, the solid component is desirably separated from the liquid to provide purity and clarity to the wine.

One method for separating liquids and solids is known as surface filtering. In a surface filtering process, the liquid-solid mixture is passed through a filter element under the influence of gravity or a relatively low pressure. The liquid component of the mixture passes through the filter element while the solid component is retained primarily on the surface of the filter element. However, with this type of filtering process, once the surface of the filter element is substantially covered with solid particulate matter, liquid is no longer able to pass through. Thus, surface filter processes are useful only for filtering slurries having a low concentration of solid matter.

A method more suitable for filtering slurries having a relatively high concentration of solids utilizes an apparatus referred to as a tube press. A tube press typically includes a cylindrical tube with a smaller diameter cylindrical filter concentrically positioned therein. A flexible bladder is positioned adjacent the inner surface of the tube. A fixed volume of slurry is introduced into a space between the tube and the inner filter and an inlet to the tube is closed and sealed. Hydraulic fluid is forced under pressure into a gap between the tube and the bladder to expand the bladder. The expansion of the bladder forces the liquid within the tube through the filter, while the solid matter is retained within the tube. However, this method of filtering is inefficient because the tube press only processes a fixed volume of slurry during a filtering cycle. As a result, the solid matter remaining at the end of the filter cycle is typically only a small percentage of the total available volume defined between the tube and the filter. Additionally, solids must be removed and the filter cleaned between each filtering cycle. Consequently, this process is typically used only in applications where the slurry has an extremely high concentration of solids or in applications where an extremely dry particulate "cake" is desired.

Another method of filtering slurries having relatively high concentrations of solid matter uses an apparatus known as a filter press, which operates under a displacement filtering principle. A filter press utilizes a series of filter plates placed adjacent to one another. A space is defined between each pair of the filter plates and each space is lined with filter media. Typically, each of the filter plates include a central aperture. Thus, all of the spaces between each pair of plates communicate with one another. An inlet is provided to introduce slurry into the interconnected spaces on an upstream side of the filter media. One or more outlets communicate with each space on a downstream side of the filter element.

Slurry is introduced through the inlet to fill all of the individual spaces between the filter plates. Once the spaces are filled, the delivery pressure of the incoming slurry is increased such that the liquid component is displaced through the filter media and the solid particulate matter is retained within the spaces upstream from the filter media. The filtered liquid, or filtrate, moves to the outlet(s), where it is discharged. The filter cycle continues until each of the spaces is substantially filled with particulate matter. Thus, the filter press utilizes substantially the entire volume of the spaces rather than relying on the surface area of the filter media, as is the case with surface filtering methods. However, due to the large forces generated by the pressure within the spaces, a large and costly support frame and hydraulic system is necessary to hold the plates together during the filter cycle. In addition, the solid particulate "cake" remaining in each individual space after the filter cycle must be removed in preparation for a subsequent filter cycle. Because as many as a hundred or more individual plates may be used, the cleaning process is very time-consuming and results in excessive down-time in which the filter press is not utilized. Also, due to the provision of multiple plates, which must be separated from one another to allow the particulate matter to be discharged and the filter media to be cleaned, fully automated filtering systems are often prohibitively expensive.

SUMMARY OF THE INVENTION

Advantageously, preferred embodiments and methods utilize a displacement principle for filtering slurries having a relatively high concentration of solids without the above-described disadvantages associated with the filter press. Preferred embodiments utilize a simplified structural arrangement to permit a less costly support structure and closure system to be provided. In addition, preferred embodiments drastically reduce the time necessary for discharging particulate matter and preparing the filter for subsequent use. Furthermore, preferred embodiments are desirably capable of being equipped with simplified and cost-effective automated cleaning systems to preferably completely eliminate the need for an operator and further reduce the down-time of the filter apparatus.

A preferred embodiment is a filter apparatus including a first outlet and a second outlet. The filter additionally includes an annular inner filter defining an external surface, an internal surface and an internal cavity. The first outlet is located downstream from the internal surface of the inner filter. An outer filter surrounds the inner filter and defines an internal surface and an external surface. The inner filter and the outer filter define an annular particulate collection volume. The second outlet is located downstream from the external surface of the outer filter. The filter includes an inlet directing fluid into the particulate collection volume before the fluid passes through either the inner filter or the outer filter. A pressure source is positioned upstream from the inlet and directs pressure through the inlet to force fluid within the particulate collection volume through the inner filter to the first outlet and through the outer filter to the second outlet.

A preferred embodiment is a filter apparatus for dewatering a slurry including a pressure vessel having a first end, a second end, and a one-piece, annular side wall portion. The side wall portion has an internal surface generally defining an internal space and one of the first end and the second end defines an opening to permit access to the internal space. A closure is sized and shaped for selectively closing the opening. The pressure vessel and the closure are configured to withstand a pressure of at least 25 psi in the internal space when the opening is closed. An annular inner filter defines an external surface and an internal cavity, the internal cavity at least partially defining a first outlet space. A substantial portion of the inner filter which forms the external surface includes a first filter media. An outer filter surrounds the inner filter and defines an internal surface facing the external surface. A substantial portion of the outer filter which forms the internal surface includes a second filter media. The first filter media and the second filter media comprise a woven material or a material configured to retain a particulate size greater than or equal to about 0.25 microns. The first and second filter media define an annular particulate collection volume between them. The outer filter and the internal surface of the vessel define a second outlet space between them. An inlet communicates with the internal space and is configured to direct a slurry into the particulate collection volume before the slurry passes through either the inner filter or the outer filter. An outlet communicates with the internal space and is in fluid communication with both the first outlet space and the second outlet space. A pressure source is upstream from the inlet and pressure from the pressure source is directable through the inlet to force a fluid component of a slurry within the particulate collection volume through the inner filter to the first outlet space and through the outer filter to the second outlet space. The first and second filter media retain a solid component of a slurry within the particulate collection volume to form a particulate cake. The opening is sized and shaped to permit a particulate cake within the particulate collection volume to be removed through the opening.

A preferred embodiment is a filter apparatus for dewatering a slurry including a pressure vessel having a first end, a second end, and a one-piece, annular side wall portion. The side wall portion has an internal surface generally defining an internal space. Either the first end or the second end defines an opening to permit access to the internal space. A closure is sized and shaped for selectively closing the opening. An annular inner filter defines an external surface and an internal cavity, which at least partially defines a first outlet space. A substantial portion of the inner filter which forms the external surface includes a first filter media. An outer filter surrounds the inner filter and defines an internal surface facing the external surface. The internal surface and the external surface are substantially parallel and a substantial portion of the outer filter which forms the internal surface includes a second filter media. The first filter media and the second filter media comprise either a woven material or a material configured to retain a particulate size greater than or equal to about 0.25 microns. The first and second filter media define an annular particulate collection volume therebetween and the outer filter and the internal surface of the vessel define a second outlet space therebetween. An inlet communicates with the internal space and is configured to direct a slurry into the particulate collection volume before the slurry passes through either of the inner filter and the outer filter. An outlet communicates with the internal space and is in fluid communication with the first outlet space and the second outlet space. A pressure source is upstream from the inlet and pressure from the pressure source is directable through the inlet to force a fluid component of a slurry within the particulate collection volume through the inner filter to the first outlet space and through the outer filter to the second outlet space. The first and second filter media retain a solid component of a slurry within the particulate collection volume to form a particulate cake. The opening is sized and shaped to permit a particulate cake within the particulate collection volume to be removed through the opening. The pressure source produces a first fluid pressure upstream from the particulate collection volume and a second fluid pressure downstream from the particulate collection volume. The difference between the first fluid pressure and the second fluid pressure define a pressure differential. The filter apparatus is configured to withstand operating pressure differentials of at least 25 psi.

A preferred embodiment is a filter apparatus for filtering a slurry including a pressure vessel having a first end, a second end and an annular wall. A support portion is configured to secure the pressure vessel in a location. The wall of the pressure vessel includes a first portion between the support and the first end or the second end of the vessel. The first portion of the wall is capable of providing sufficient resistance to gravity acting on the first portion of the wall to maintain the structural integrity of the first portion of the wall. An annular inner filter defines an external surface and an internal cavity, which at least partially defines a first outlet space. A substantial portion of the inner filter which forms the external surface includes a first filter media. An outer filter surrounds the inner filter and defines an internal surface facing the external surface. A substantial portion of the outer filter which forms the internal surface includes a second filter media. The first filter media and the second filter media comprise either a woven material or a material configured to retain a particulate size greater than or equal to about 0.25 microns. The first and second filter media define an annular particulate collection volume therebetween and the outer filter and the internal surface of the vessel defining a second outlet space therebetween. An inlet communicates with the internal space and directs the slurry into the particulate collection volume before passing through either of the inner filter and the outer filter. An outlet communicates with the internal space and is in fluid communication with the first outlet space and the second outlet space. A pressure source is upstream from the inlet and pressure from the pressure source is directable through the inlet to force a fluid component of a slurry within the particulate collection volume through the inner filter to the first outlet space and through the outer filter to the second outlet space. The first and second filter media retain a solid component of a slurry within the particulate collection volume to form a particulate cake.

A preferred embodiment is a filter apparatus as recited in the preceding paragraph and additionally comprising a second support portion configured to secure the pressure vessel in a location. The wall of the pressure vessel including a second portion between the first support and the second support. The second portion of the wall being capable of providing sufficient resistance to gravity acting on the second portion of the wall to maintain the structural integrity of the second portion of the wall. A preferred embodiment is a filter apparatus as in the preceding paragraph, wherein the inner filter and the outer filter comprise a filter assembly having a first end and a second. The filter apparatus further comprising a first filter assembly support and a second filter assembly support. The filter assembly includes a portion between the first filter assembly support and the second filter assembly support. The portion of the filter assembly being capable of providing sufficient resistance to gravity acting on the filter assembly to maintain the structural integrity of the filter assembly.

A preferred embodiment is a filter apparatus for dewatering a slurry, including a pressure vessel having a first end, a second end, and a one-piece, annular side wall portion. The side wall portion has an internal surface generally defining an internal space. One of the first end and the second end defines an opening to permit access to the internal space and a closure is sized and shaped for selectively closing the opening. The pressure vessel and the closure are configured to withstand a pressure of at least 25 psi in the internal space when the opening is closed. The apparatus includes at least one filter assembly comprising a first filter and a second filter. The first filter defines a first surface and at least partially defines a first outlet space. A substantial portion of the first filter which forms the first surface comprises a first filter media. The second filter defines a second surface facing the first surface and at least partially defines a second outlet space. A substantial portion of the second filter which forms the second surface comprises a second filter media. The first and second filter media define a particulate collection volume therebetween. An inlet communicates with the internal space and is configured to direct a slurry into the particulate collection volume before passing through either of the first filter and the second filter. An outlet communicates with the internal space and is in fluid communication with the first outlet space and the second outlet space. A pressure source is disposed upstream from the inlet, wherein pressure from the pressure source is directable through the inlet to force a fluid component of a slurry within the particulate collection volume through the first filter to the first outlet space and through the second filter to the second outlet space. The first and second filter media retain a solid component of a slurry within the particulate collection volume to form a particulate cake. The opening is sized and shaped to permit a particulate cake within the particulate collection volume to be removed through the opening. The apparatus also includes a scraper sized and shaped to extend substantially from the first filter media to the second filter media. The scraper is movable from a first end of the particulate collection volume toward a second end of the particulate collection volume to remove particulate cake from the particulate collection volume.

A preferred embodiment is a filter apparatus for dewatering a slurry, comprising a pressure vessel having a first end, a second end, and a one-piece, annular side wall portion. The side wall portion has an internal surface generally defining an internal space. One of the first end and the second end define an opening to permit access to the internal space. A closure is sized and shaped for selectively closing the opening. The apparatus includes at least one filter assembly comprising a first filter and a second filter. The first filter define a first surface and at least partially defines a first outlet space. A substantial portion of the first filter which forms the first surface comprises a first filter media. The second filter defines a second surface facing the first surface and at least partially defines a second outlet space. The first surface and the second surface are substantially parallel and a substantial portion of the second filter which forms the second surface comprises a second filter media. The first and second filter media define a particulate collection volume therebetween. An inlet communicates with the internal space and is configured to direct a slurry into the particulate collection volume before passing through either of the first filter and the second filter. An outlet communicates with the internal space and is in fluid communication with the first outlet space and the second outlet space. A pressure source is disposed upstream from the inlet, wherein pressure from the pressure source is directable through the inlet to force a fluid component of a slurry within the particulate collection volume through the first filter to the first outlet space and through the second filter to the second outlet space. The first and second filter media retain a solid component of a slurry within the particulate collection volume to form a particulate cake. The opening is sized and shaped to permit a particulate cake within the particulate collection volume to be removed through the opening. The pressure source produces a first fluid pressure upstream from the particulate collection volume and a second fluid pressure downstream from the particulate collection volume. The difference between the first fluid pressure and the second fluid pressure defines a pressure differential. The filter apparatus is configured to withstand operating pressure differentials of at least 25 psi. The apparatus also includes a scraper sized and shaped to extend substantially from the first filter media to the second filter media, the scraper being movable from a first end of the particulate collection volume toward a second end of the particulate collection volume to remove particulate cake from the particulate collection volume.

A preferred embodiment is a filter apparatus for filtering a slurry, comprising a pressure vessel having a first end, a second end and an annular wall. A support portion is configured to secure the pressure vessel in a location. The wall of the pressure vessel includes a first portion between the support and one of the first end and the second end of the vessel, which is capable of providing sufficient resistance to gravity acting on the first portion of the wall to maintain the structural integrity of the first portion of the wall. The apparatus includes at least one filter assembly having a first filter and a second filter. The first filter defines a first surface and at least partially defines a first outlet space. A substantial portion of the first filter which forms the first surface comprises a first filter media. The second filter defines a second surface facing the first surface and at least partially defines a second outlet space. A substantial portion of the second filter which forms the second surface comprises a second filter media, the first and second filter media defining a particulate collection volume therebetween. An inlet communicates with the internal space and directs the slurry into the particulate collection volume before the slurry passes through either of the first filter or second filter. An outlet communicates with the internal space and is in fluid communication with the first outlet space and the second outlet space. A pressure source is disposed upstream from the inlet, wherein pressure from the pressure source is directable through the inlet to force a fluid component of a slurry within the particulate collection volume through the first filter to the first outlet space and through the second filter to the second outlet space. The first and second filter media retain a solid component of a slurry within the particulate collection volume to form a particulate cake. A scraper is sized and shaped to extend substantially from the first filter media to the second filter media. The scraper is movable from a first end of the particulate collection volume toward a second end of the particulate collection volume to remove particulate cake from the particulate collection volume.

A preferred method of separating particulate matter from a slurry includes providing a first outlet and providing a particulate collection volume. The method additionally includes providing a first annular filter separating the first outlet from the particulate collection volume. A flow of the slurry is directed into the particulate collection volume under sufficient pressure to force fluid through the first annular filter and any of the particulate matter blocking a filtering surface of the first annular filter to substantially fill the particulate collection volume with particulate.

A preferred embodiment is a filter apparatus including a pressure vessel defining an interior space. The filter apparatus includes a first filter defining a first surface and a second filter defining a second surface. The second surface faces the first surface. The first filter and the second filter at least partially define a particulate collection volume therebetween. An inlet directs fluid into the particulate collection volume before the fluid passes through either the first filter or the second filter. At least one outlet is located downstream from at least one of the first surface and the second surface. A pressure source is positioned upstream from the inlet and directs pressure through the inlet to force fluid within the collection volume through the first filter and the second filter to the at least one outlet.

A preferred embodiment is a filter apparatus having an annular inner filter defining an internal cavity and an outer filter surrounding the inner filter. The inner filter and the outer filter define an annular particulate collection volume when the filter apparatus is in a closed position. The inner filter and the outer filter are movable axially with respect to one another to define an open position wherein particulate may be emptied from the filter apparatus. The filter includes an inlet and an outlet. The outlet is located downstream from the particulate collection volume and the inlet directs fluid into the particulate collection volume before the fluid passes through either the inner filter or the outer filter. The filter also includes a drive having a portion which exerts force on at least one of the inner filter and the outer filter to move the filter apparatus between the open position and the closed position.

A preferred embodiment is a method of separating particulate matter from a slurry including providing a filter apparatus comprising an annular inner filter and an outer filter surrounding the inner filter. The inner filter and the outer filter define an annular particulate collection volume between them. The filter apparatus further includes an outlet located downstream from the particulate collection volume and an inlet directing fluid into the particulate collection volume before the fluid passes through either the inner filter or the outer filter. The method further includes initiating a filtering cycle comprising directing a flow of the slurry into the particulate collection volume under sufficient pressure to force fluid through the inner and outer filters and any of the particulate matter blocking a filtering surface of the inner and outer filters to substantially fill the particulate collection volume and initiating a drive to move the inner filter and the outer filter axially with respect to one another upon completion of the filtering cycle to empty particulate from the particulate collection volume.

A preferred embodiment is a filter apparatus including an annular inner filter defining an internal cavity and an outer filter surrounding the inner filter. The inner filter and the outer filter define an annular particulate collection volume when the filter apparatus is in a closed position. The inner filter and the outer filter are movable axially with respect to one another to define an open position wherein particulate may be emptied from the filter apparatus. An outlet is located downstream from the particulate collection volume and an inlet directs fluid into the particulate collection volume before the fluid passes through either the inner filter or the outer filter. The filter includes means for moving the filter apparatus between the open position and the closed position.

BRIEF DESCRIPTION OF THE DRAWINGS

These and other features of the preferred filters and methods will be described with reference to drawings of the preferred embodiments. These embodiments are merely intended to illustrate, rather than limit, the present invention. The drawings contain seventeen figures:

FIG. 6B is a schematic cross section of an alternative filter assembly wherein multiple sets of filters are provided in a concentric arrangement;

FIG. 6C is a schematic cross section of an alternative filter assembly having a plurality of radially extending filters;

FIG. 6D is a schematic cross section of an alternative filter assembly having a plurality of linear filters;

DETAILED DESCRIPTION OF PREFERRED EMBODIMENTS

Figure 1:
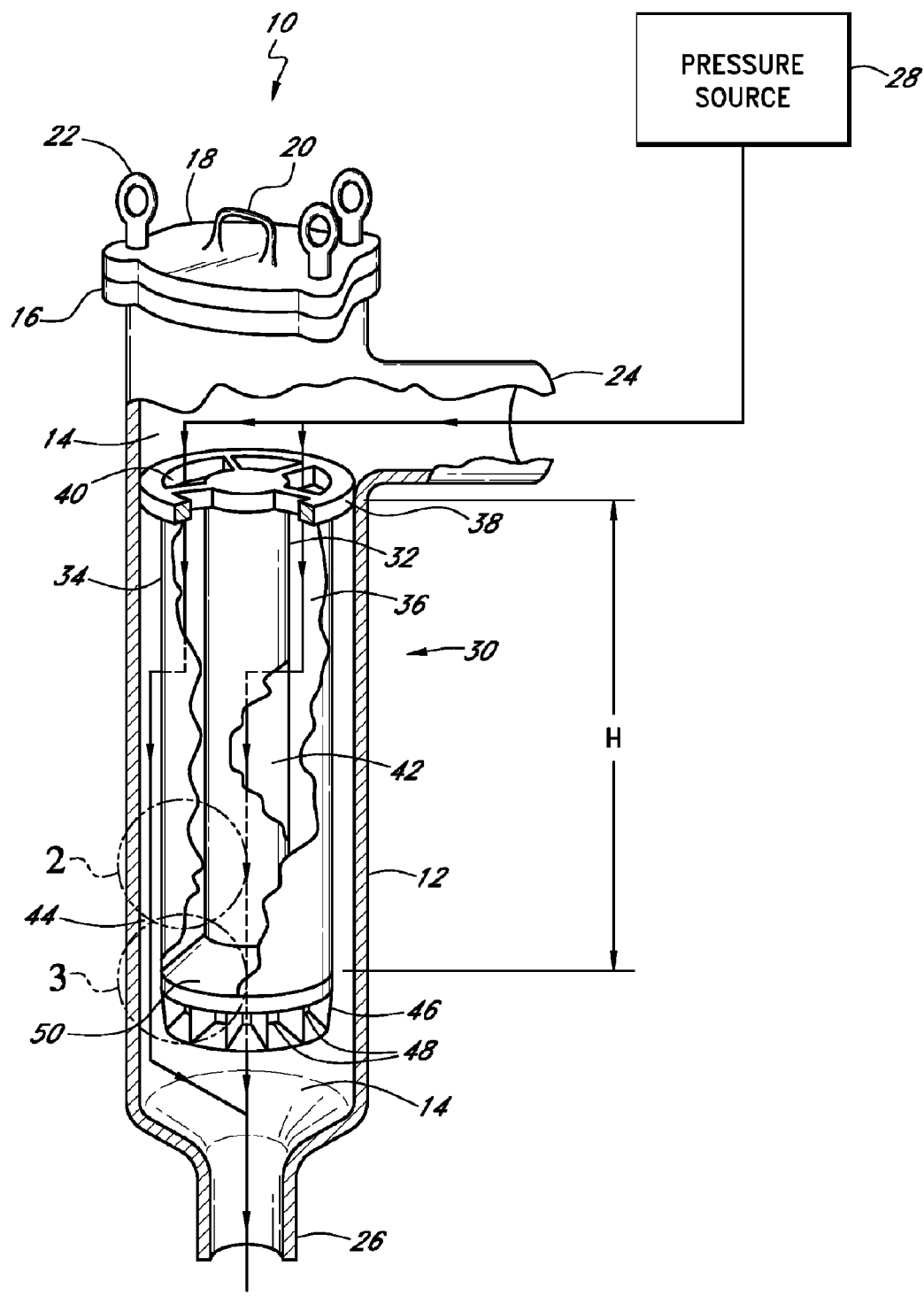
FIG. 1 is a partial schematic, perspective view of a preferred filter apparatus. A portion of several components have been cut away to illustrate internal features of the filter, including an inner filter and an outer filter.
Figure 2:
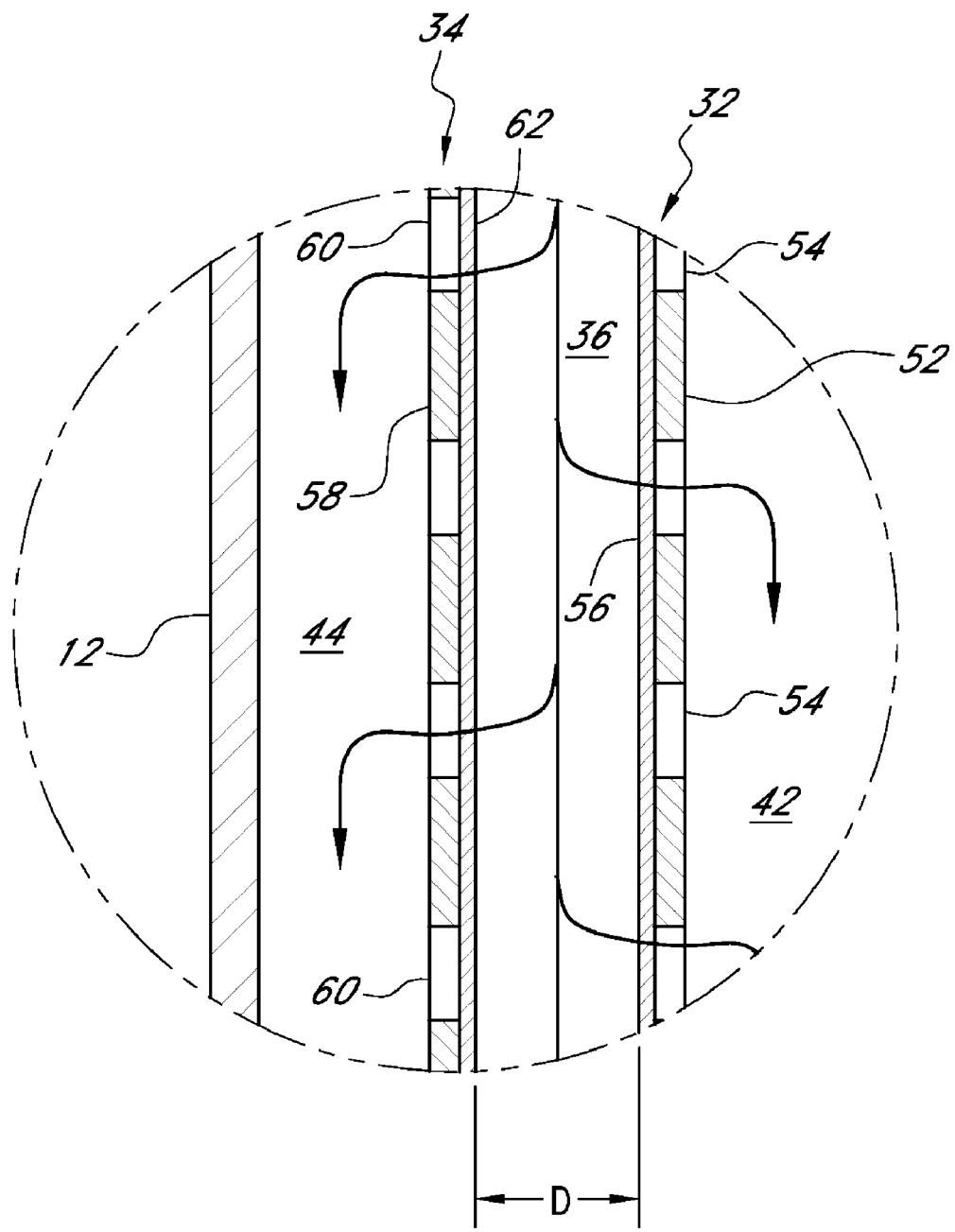
FIG. 2 is an enlarged cross section view of the portion of the filter apparatus of FIG. 1 within the circle labeled 2 in FIG. 1.
Figure 3:
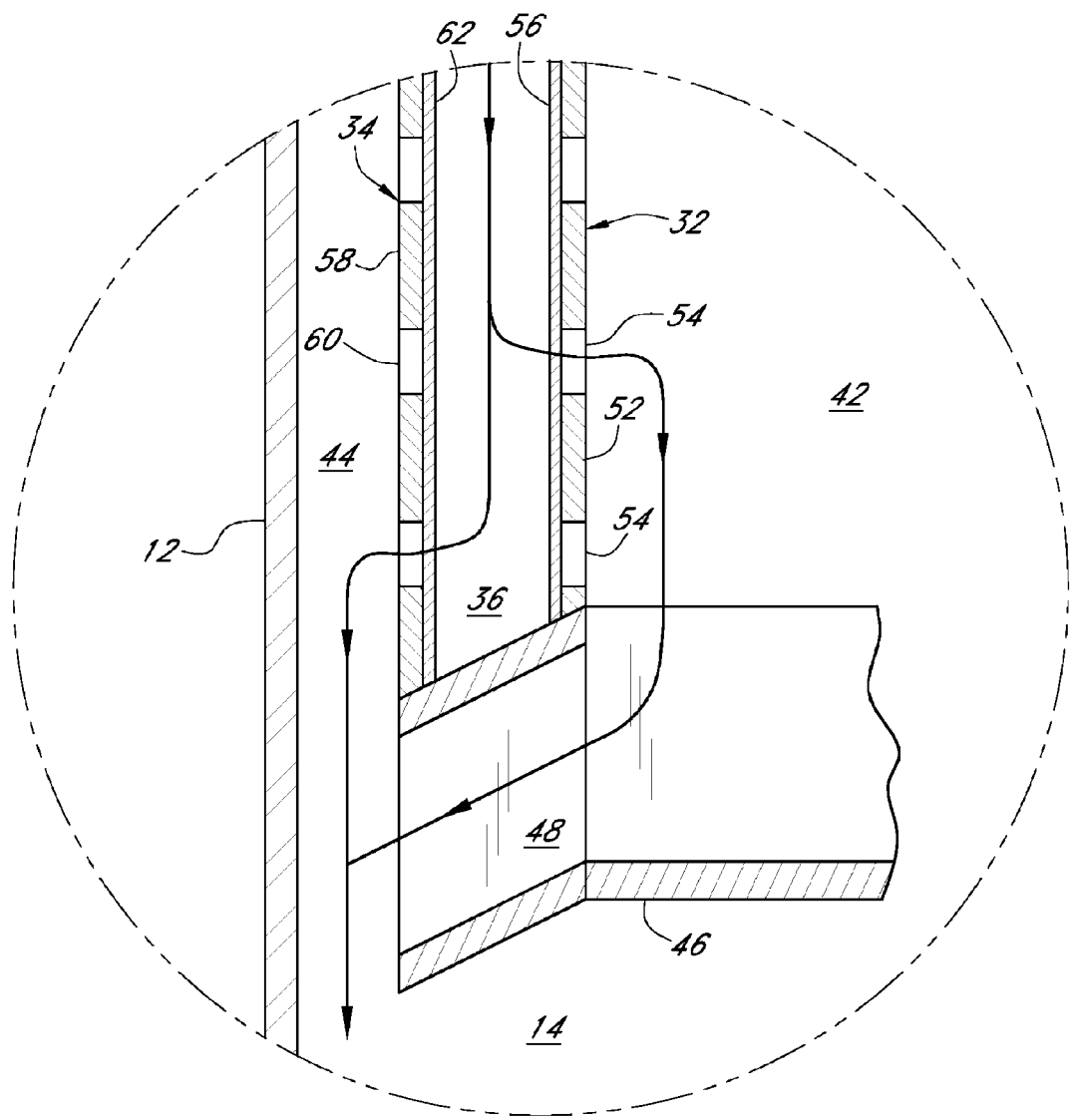
FIG. 3 is an enlarged cross section view of the portion of the filter apparatus of FIG. 1 within the circle labeled 3 in FIG. 1.

FIGS. 1-3 illustrate a preferred embodiment of a filter apparatus 10, generally referred to as a "filter" herein. The filter 10 includes a substantially tube-shaped vessel 12 that defines an enclosed space, generally referred to by the reference numeral 14. The upper, open end of the vessel 12 terminates in a flange 16, which extends generally perpendicular to the wall of the vessel 12. A closure, or lid 18, preferably rests on the flange 16 to close the upper end of the vessel 12. The lid 18 may include a handle 20 to allow the lid 18 to be easily removed. Desirably, the lid 18 is capable of being secured to the vessel 12 so as to form a fluid tight seal. In the illustrated embodiment, a number of threaded fasteners, such as eyebolts 22, secure the lid 18 to the flange portion 16 of the vessel 12. However, other suitable means of attachment may also be used, such as other mechanical or hydraulic means. In addition, other suitable methods of closing the vessel 12 may be utilized.

The vessel 12 includes an inlet 24 and outlet 26, each of which allow fluid communication with the enclosed space 14. The outlet 26 of the illustrated embodiment is located at a bottom portion of the vessel 12 and is coaxial with a longitudinal axis of the filter 10. However, the outlet 26 may alternatively be positioned in other suitable locations. For example, the outlet 26 may extend from the side wall of the vessel 12, perpendicular to a longitudinal axis of the filter 10, similar to the inlet 24. Alternatively, the bottom end of the vessel 12 may terminate in a flange, and a separate outlet member may be connected thereto, in a manner similar to the lid 18.

A pressure source 28 is located upstream from the inlet 24 to supply an unfiltered liquid, or slurry, to the enclosed space 14 of the filter 10. The pressure source 28 may comprise any type of pump or other mechanism suitable to create a pressurized slurry. Obviously, as one of skill in the art will recognize, there may be some applications in which the slurry may be pre-treated and/or pre-filtered prior to reaching the inlet 24. For example, the illustrated filter apparatus 10 may comprise a portion of a larger filtering apparatus or system.

A filter assembly, referred to generally by the reference numeral 30, is positioned within the enclosed space 14 between the inlet 24 and the outlet 26. In the illustrated embodiment, the filter assembly 30 comprises at least an inner filter 32 and an outer filter 34. Each of the inner and outer filters 32 and 34 is substantially annular in shape and are capable of allowing liquid to pass through while retaining solid particulate matter. Preferably, each of the filters 32 and 34 is cylindrical in shape to equalize pressure. The space between the inner and outer filters, 32 and 34, defines a collection volume 36 for collecting solid particulate matter.

An end cover, such as a substantially circular plate 38 is secured to the upper end of the inner and outer filters, 32 and 34 and is in sealed engagement with the interior surface of the vessel 12. Desirably, the plate 38 is sized, shaped and constructed from a suitable material which will maintain a substantially watertight seal with the interior, cylindrical surface of the vessel 12. Alternatively, other sealing arrangements may be used, such as providing a separate seal member between the plate 38 and the vessel 12. In another alternative, the inlet 24 may be formed by, or connected to, the lid 18 and the plate 38 may be sealed to the vessel 12 at, or near, the flange portion 16. In one arrangement, this may be accomplished by positioning a peripheral portion of the plate 38 between the flange 16 and the lid 18. Other configurations, apparent to those of skill in the art, which guide the slurry into the collection volume 36 without allowing slurry to pass to a downstream side of the filters 32, 34 may also be used.

The plate 38 includes several openings 40 that extend axially through the plate 38. The openings 40 direct fluid into the collection volume 36 between the inner and outer filters, 32 and 34, respectively. Solid central and peripheral portions of the plate 38 prevent fluid from passing to the downstream side of the filter assembly 30 without first entering the collection volume 36.

Desirably, the inner filter 32 is substantially hollow and defines an interior space 42 surrounded by the inner filter 32. The outer filter 34 is spaced from the interior surface of the vessel 12 to define an exterior space 44 surrounding the outer filter 34. The filter 10 additionally includes a transfer assembly 46 configured to provide an outlet from the interior space 42 to direct fluid from the interior space 42 to the exterior space 44. Desirably, the transfer assembly 46 is substantially circular and is positioned at the lower end of the inner and outer filters, 32 and 34. The illustrated transfer assembly 46 includes a plurality of channels 48 that connect the interior space 42 to the exterior space 44, as illustrated in greater detail in the cross section view of FIG. 3. The transfer assembly 46 also includes a solid end cover, or base portion, 50 closing the lower end of the collection volume 36. Optionally, the base portion 50 may be separate from the transfer assembly 46. In an alternative arrangement, the lower end of the interior space 42 may be open and allow fluid to pass directly to the exterior space 44 without passing through a transfer assembly 46.

FIG. 2 is an enlarged cross-section view of a portion of the filter 10 within the circle labeled 2 in FIG. 1. Preferably, the inner filter 32 includes a rigid filter support, or tube 52, having a plurality of apertures 54 which allow liquid to pass therethrough. Filter media 56 is positioned adjacent to the external surface of the inner filter tube 52 to separate the collection volume 36 from the interior space 42. The filter media 56 is desirably comprised of a suitable material constructed to allow liquid to pass therethrough but to retain particulate matter. For example, the media may be constructed of paper, cotton, polyester, polypropylene, metal materials (e.g., stainless steel), or other suitable materials that may be determined by one of skill in the art. The filter media may be of a woven or non-woven construction. The filter media may be constructed to possess one of a variety of minimum particulate size retention capabilities, often given as a particulate size value in microns, as is known to one of skill in the art. Desirably, the filter media has a micron rating greater than, or equal to, 0.25 microns. However, as may be determined by one of skill in the art, the minimum particulate size retention of the filter media may be altered to suit a desired application. Preferably, the filter media is either of a woven construction, or has a density greater than about one-half ounce per square yard (or equivalents thereof) in order to withstand the fluid pressure that may be generated during the filtering process.

Similarly, the outer filter 34 includes a filter tube 58 having a plurality of apertures 60. Filter media 62 is positioned adjacent the interior surface of the outer filter tube 58. Thus, the collection volume 36 is preferably defined between the filter media 56 of the inner filter 32 and the filter media 62 of the outer filter 34. A radial distance D is defined between the inner filter 32 and the outer filter 34. More specifically, in the illustrated embodiment, the distance D is defined between the inner surface of the outer filter media 62 and the outer surface of the inner filter media 56. Desirably, the distance D is less than about 4 inches. Preferably, the distance D is less than about 3 inches and more preferably, the distance D is approximately 2 inches. However, other values of the distance D may be provided depending on the particular slurry filtering application or desired dryness of the particulate within the collection volume at the end of a completed filter cycle. In addition, the facing surfaces of the inner filter media 56 and the outer filter media 62 are desirably parallel with one another. Such an arrangement assists in equalizing the pressure within the collection volume 36. In addition, the parallel relationship between the inner and outer filter media 56, 62 encourages an equal build up of particulate cake on each filter media surface. In the illustrated embodiment, the inner and outer filters 32, 34 are annular and, thus, preferably the facing surfaces of the inner filter media 56 and the outer filter media 62 are desirably coaxial with one another.

The filters 32, 34 also define a length, or elongate dimension of the collection volume 36. In the filter 10 of FIG. 1, the elongate dimension of the collection volume 36 corresponds with the vertical height H of the collection volume 36. In one arrangement, the height H of the collection volume 36 is desirably between approximately 5 and 60 inches, preferably between approximately 12 and 48 inches and more preferably approximately 30 inches. However, the value of the height H may be varied in other arrangements, depending on the particular filtering application for which the filter 10 will be used. For example, in some applications, the height H of the collection volume 36 may be much greater than 60 inches, such as 15 feet or greater, for example. Desirably, the filter tubes 52, 58 are constructed from a suitably rigid material to withstand the pressures generated in a displacement filtering process. For example, the filter tubes 52, 58 may be constructed of structural steel, stainless steel, aluminum or other alloys, plastics or other composites, or combinations thereof, and is preferably rated for pressures of up to 500 p.s.i., or higher.

Desirably, the volume of the collection volume 36 is between approximately 0.25 and 5,000 liters and, preferably, between approximately 1 and 500 liters. Additionally, the surfaces of both the inner and outer filter media 56, 62 define a surface area. Desirably, the total surface area of the inner and outer filters 56, 62 is between approximately 200 and 80,000 square inches. Preferably, the total surface area of the inner and outer filters 56, 62 is between approximately 200 and 8,000 square inches and more preferably between approximately 200 and 800 square inches. A ratio of the volume to surface area is desirably about 576 cubic inches per square foot, preferably about 432 cubic inches per square foot and more preferably about 288 cubic inches per square foot. However, the volume and surface area defined by the filter may be varied to produce a filter apparatus suitable for other filtering applications.

The filter apparatus 10 is operable to separate solid matter from a solid-liquid mixture, or slurry. The illustrated filter 10 is especially useful for filtering slurries with a relatively high concentration of solid matter, such as above about 1000 parts per million (ppm) or 5,000 ppm, for example, and may be used to filter slurries with a concentration as high as 10,000 to 500,000 ppm. With reference to FIGS. 1-3, a slurry is introduced to the filter 10 by the pressure source 28. At the beginning of a filtering cycle, the pressure source 28 supplies the slurry to the filter apparatus 10 at a low to moderate pressure simply to fill the collection volume 36. The slurry flows into the enclosed space 14 of the filter apparatus 10 through the inlet 24 and into the collection volume 36 through the openings 40 of the plate 38, as illustrated by the arrows of FIG. 1.

Once the collection volume 36 has been substantially filled with slurry, the slurry delivery pressure is gradually increased by the pressure source 28. In response to the incoming slurry, the liquid component of the slurry within the collection volume 36 is forced through either the inner filter 32 or the outer filter 34 while the solid particulate component is retained within the collection volume 36 due to the filter media 56, 62.

Liquid moving through the inner filter 32 passes through the filter media 56 and through one of the plurality of apertures 54 of the inner filter tube and into the interior space 42. Liquid moving through the outer filter 34 first passes through the filter media 62 and through one of the plurality of apertures 60 of the outer filter tube 58 and into the exterior space 44. Liquid filtrate within the interior space 42 passes through the channels 48 of the transfer assembly 46 to merge with liquid filtrate in the exterior space 44, as illustrated by the arrows of FIG. 3. The filtrate then passes from the enclosed space 14 of the vessel 12 through the outlet 26. The outlet 26 may empty into a suitable container or collection system, or may be connected to a drain or other suitable waste removal system.

Typically in a displacement filtering process, the pressure of the slurry supplied to the filter 10 by the pressure source 28 gradually increases throughout the cycle to compensate for the particulate matter building up within the particulate collection volume 36. The particulate matter remaining in the collection volume 36 at the end of a filter cycle, is generally referred to as cake. Preferably, the minimum pressure during the filtering cycle (i.e., not including the initial filling of the collection volume 36) is approximately 25 p.s.i. Desirably, the pressure increases over the course of the filtering cycle to a maximum of approximately 100 p.s.i. In other applications, the maximum pressure during a filtering cycle may reach approximately 225 p.s.i. and, if desired, the maximum pressure may reach up to 1500 p.s.i. or more. The filter apparatus 10 may be constructed to reach even higher maximum pressures during the filtering cycle, depending on the type of slurry processed or desired dryness of the particulate cake.

The above-described process is commonly referred to as displacement filtering, as liquid is displaced from the collection volume 36 thereby leaving substantially only solid particulate matter remaining. At the end of a filtering cycle, substantially the entire collection volume 36 is desirably filled with particulate. When a 100 p.s.i. maximum pressure is reached during the filtering cycle, the particulate cake is approximately 25-35% dry. When a 225 p.s.i. maximum pressure is reached during the filtering cycle, the particulate cake is approximately 35-45% dry. The dryness percentages are given in terms of the weight of the solid particulate remaining in the particulate collection volume 36 compared to the weight of both the solid and liquid remaining in the collection volume 36.

Once the filter cycle is completed, the threaded fasteners 22 are removed to allow the lid 18 to be removed from the vessel 12. The filter assembly 30 is then capable of being removed through the open, upper end of the vessel 12. The inner filter 32 may also be removed from the outer filter 34 to allow the particulate cake to be removed from the collection volume 36. For example, in one arrangement, the inner filter 32 may be secured to the transfer assembly 46 to form a first subassembly and the outer filter 34 may be secured to the end cover 38 to form a second subassembly. The first subassembly may be separated from the second subassembly to expose the collection volume 36 and allow the particulate cake to be discharged. In other arrangements, the filter assembly 30 may be disassembled in an alternative manner to allow for discharging of the particulate cake. Once the particulate cake has been removed from the collection volume 36, the inner and outer filters 32, 34 are cleaned, reassembled and the filter assembly 30 is positioned back within the vessel 12 so that another filter cycle may be carried out. Thus, preferably the particulate cake may be removed from the annular collection volume through the opening of the vessel 12. Such an arrangement permits particulate cake to be emptied from the filter apparatus 10 quickly and efficiently.

Advantageously, the illustrated embodiment utilizes a pressure vessel arrangement to structurally withstand the forces generated due to the relatively high pressures typical of a displacement filtering process. Specifically, the vessel 12 is desirably substantially cylindrical in shape. The vessel 12 defines a substantially continuous cylindrical wall portion and, preferably, a closed end, with the exception of the outlet 26. That is, the wall portion of the vessel 12 is desirably a single piece and is annular in shape. More preferably, the vessel 12 is a monolithic structure. Thus, the cylindrical wall portion of the vessel 12 does not require an externally applied force to counteract the forces produced as a result of the displacement filtering process. The forces generated by the filtering process are substantially absorbed by the vessel 12 itself. Desirably, the only external closure force necessary is to secure the lid 18 to the vessel 12. In the illustrated embodiment, this function is performed by the threaded fasteners 22. Preferably, the vessel 12 and closure arrangement (e.g., the lid and fasteners 22) are capable of withstanding a pressure within the internal space 14 of at least 25 p.s.i. Other means of securing the lid 18 to the vessel 12 may be used, such as other mechanical fasteners or a hydraulic system, as may be determined by one of skill in the art. Additionally, the filter 10 desirably is capable of withstanding operating pressure differentials of at least 25 p.s.i. A pressure differential of the filter 10 may be defined as a difference between the fluid pressure upstream from the filters 32, 34 and the fluid pressure downstream from the filters 32, 34.

Figure 4:
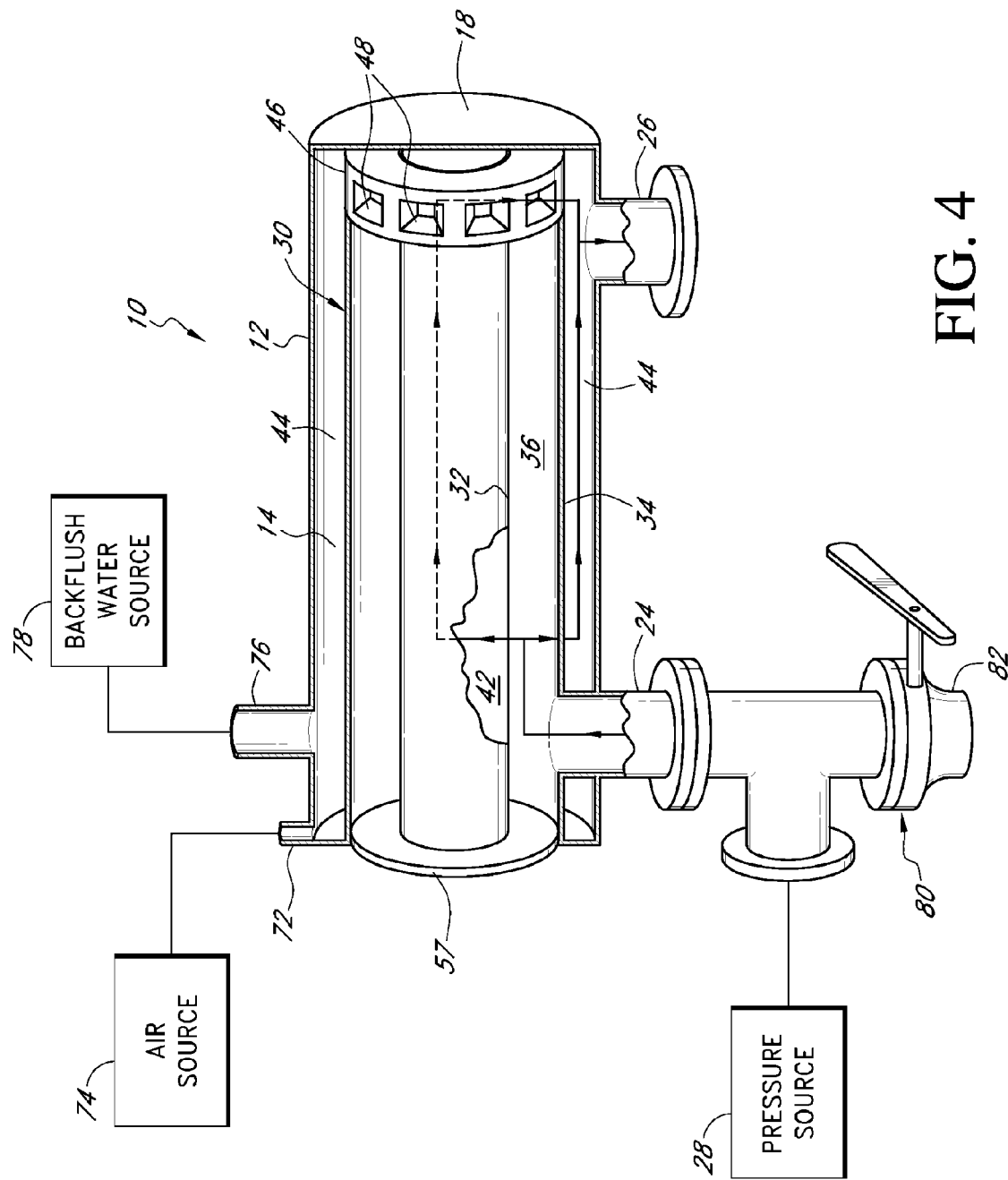
FIG. 4 is a partial schematic, perspective view of an alternative embodiment of a filter apparatus. A portion of several components have been cut away to illustrate internal components and features of the filter, including an inner filter and an outer filter.
Figure 5:
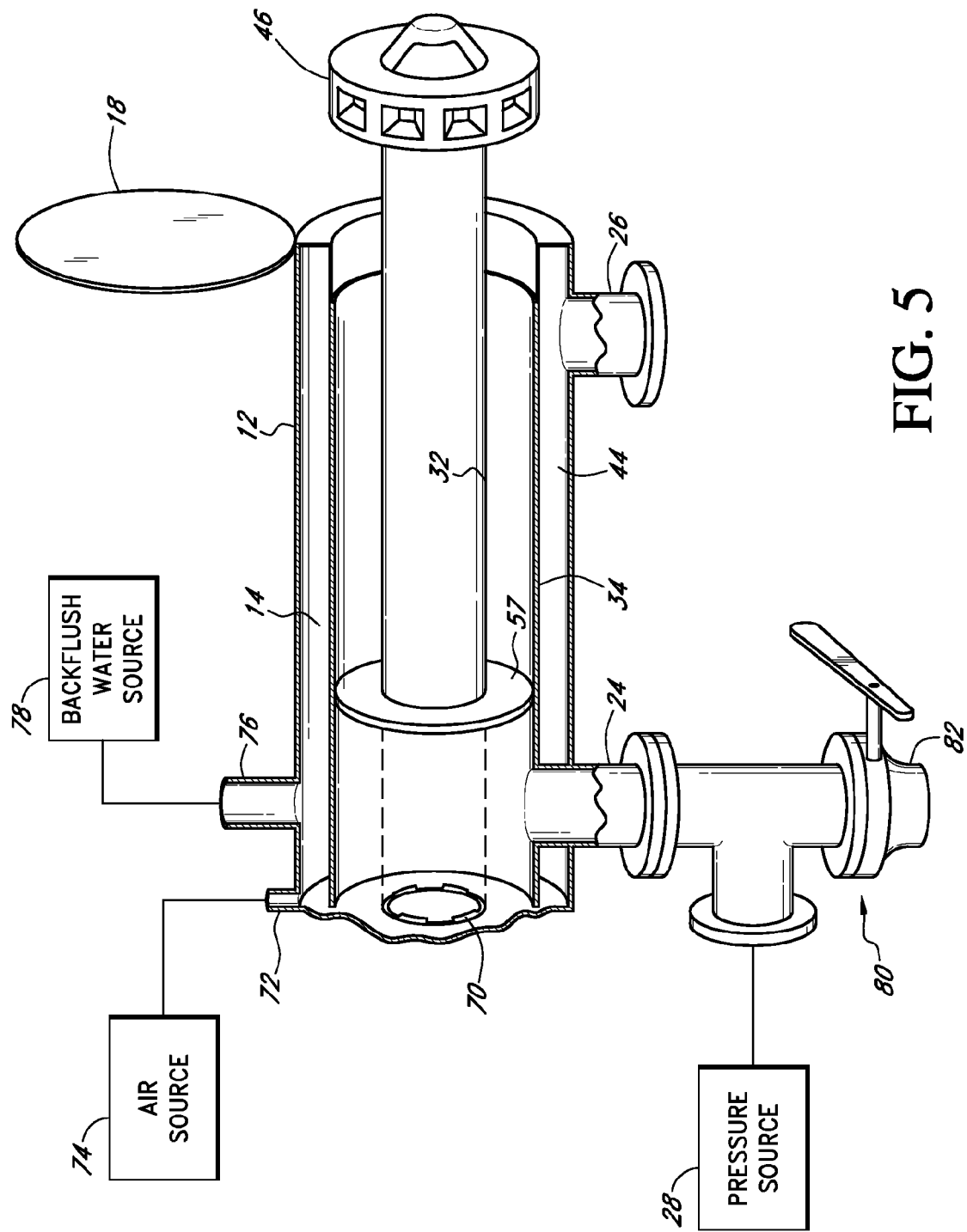
FIG. 5 illustrates the filter apparatus of FIG. 3 having the inner filter partially extracted from the filter apparatus to allow particulate to be discharged.

In addition to withstanding fluid pressure from the filtering process, the annular side wall of the vessel 12 desirably is also self-supporting. That is, the side wall of the vessel 12 supports its own weight. In the embodiment of FIGS. 1-3, the filter 10 may be supported by one, or both, of the tubular members defining the outlet 26 and the inlet 24, for example. The portion of the annular wall of the vessel 12 between the inlet 24 and the outlet 26 is capable of supporting its own weight. In addition, the portion of the annular wall of the vessel 12 between the inlet 24 and the open, upper end of the filter 10 is also capable of supporting its own weight. Similarly, if the filter 10 is mounted in a horizontal arrangement (as illustrated in FIGS. 4 and 5), the annular wall of the vessel 10 desirably is capable of supporting its own weight both in between, and to either side of, the inlet 24 and the outlet 26. Alternatively, one or more supports may be provided separately from the inlet 24 and the outlet 26, as will be readily apparent to one of skill in the art.

In contrast, in a prior art filter press assembly, it is necessary to provide an external support arrangement for each individual filter plate, in order to counteract the force of gravity. As described above, a large number of filter plates (e.g., up to 100 or more) may be provided in a single filter press. When the filter press is in a closed position, a hydraulic closure assembly applies a compressive force to each end of the filter press to hold the filter plates in contact with one another and create a fluid-tight seal therebetween. The compressive force applied by the hydraulic closure assembly also supports the filter plates against the force of gravity. To support the weight of the filter plates when the filter press is in an open position, an elongate support beam is typically provided on each side of the filter press assembly and extends the entire length of the filter press. A handle portion on each side of the filter plates rests on an upper surface of the support beam. Accordingly, the support beam must be strong enough to support the entire weight of all of the filter plates. As a result of the large number of individual filter plates that must be supported, the hydraulic closure assembly and support beam structure are both necessary. This results in a complex and heavy construction that results in the filter press being expensive to manufacture. By providing a vessel 12 that is self-supporting, the illustrated filter 10 eliminates the need for such extraneous support.

Advantageously, the illustrated filter apparatus 10 has a single seal to be maintained between the vessel 12 and the lid 18. Further, in the illustrated filter apparatus 10, the area of the lid 18 is desirably small, when compared to the interior surface area of the vessel 12, which results in a relatively small closure force being necessary to maintain a substantially fluid-tight seal between the vessel 12 and the lid 18, because the force tending the separate the lid 18 from the vessel 12 is proportional to the surface area of the lid 18. Accordingly, a large support structure and hydraulic closure system are not necessary with the present filter apparatus 10.

In contrast, in a filter press assembly, a seal must be maintained between each pair of filter plates. Up to 100 or more individual filter plates may be provided in a single filter press assembly. Typically, the plates are square in shape and the seal between them is located along an outer edge of the plates. Therefore, pressure generated during the displacement filtering process acts on substantially the entire plate. The relatively large surface area of the plates produces a large force tending to separate the plates from one another. As a result, a closure system, typically a hydraulic system, is necessary to hold the series of plates together with a sufficient force to maintain a seal between the plates. In addition, this force must be applied to the plates during the entire filter process. Further, the support structure, or frame, that supports both the assembly of filter plates and the hydraulic closure system must be rigid enough to withstand the necessary closure force produced by the closure system without substantial deflection, in order to maintain a seal between the filter plates. Both the closure system and the support structure, or frame, are expensive to manufacture.

Also, with preferred embodiments of the present filter 10, discharging of particulate cake and cleaning of the filter media may be accomplished much more quickly than that of a filter press. Because a single particulate collection volume 36 is desirably provided, the particulate matter within the collection volume 36 at the end of a filter cycle may be quickly and conveniently discharged. Even if multiple collection volumes 36 are provided, desirably, the particulate cake may be discharged through a single opening in the filter 10, which facilitates relatively rapid discharge of the particulate cake. In contrast, with a filter press, the space between each pair of filter plates must be cleaned of particulate matter. Thus, preferred embodiments of the present displacement filter reduce the overall filtering costs (e.g., labor costs and equipment costs) and permit the advantages of a displacement filtering process to be cost effective even in low volume applications.

FIGS. 4 and 5 illustrate an alternative embodiment of the filter apparatus 10. The filter apparatus 10 of FIGS. 4 and 5 is constructed and operates in a substantially similar manner to the previously described filter apparatus 10. Therefore, like reference numerals will be used to describe like components. The filter 10 of FIGS. 4 and 5 is arranged such that the longitudinal axis of the filter 10 is disposed horizontally.

The lid 18 is positioned on the open end of the vessel 12, which is located at the outlet end of the enclosed space 14. The lid 18 may be secured to the vessel 12 by any suitable means, as described in relation to the previous embodiment. With reference to FIG. 5, an optional seal 70 engages the open end of the inner filter 32 to substantially prevent slurry from entering the interior space 42 without passing through the inner filter 32. The seal 70 may be affixed to the closed end of the vessel 12 or, alternatively, it may be affixed to a closed end portion of the outer filter 34. Desirably, the seal 70 is substantially annular in shape and contacts an end portion of the inner filter 32 to create a substantially fluid-tight seal therebetween. Alternatively, other suitable sealing arrangements may be utilized to substantially prevent slurry from entering the interior space 42 without passing through the inner filter 32.

As with the previously described embodiment, slurry is pumped into the collection volume 36 through the inlet 24. However, in the embodiment of FIGS. 4 and 5, the inlet 24 opens directly into the collection volume 36 thereby eliminating the need for the plate 38 (FIG. 1) of the previous embodiment. The slurry is filtered as it moves through one of the inner filter 32 or the outer filter 34, as illustrated by the arrows of FIG. 4. Liquid filtrate that is passed through the inner filter 32 to the interior space 42 passes through the channels 48 of the transfer assembly 46 to converge with liquid filtrate which is passed through the outer filter 34 and into the exterior space 44. The liquid filtrate then exits the filter apparatus 10 through the outlet 26.

The filter apparatus 10 illustrated in FIGS. 4 and 5 includes several features which assist in the cleaning of the filter apparatus 10 once a filter cycle has been completed. These features desirably include an air purge system, a back flush system and a scraper 57. The air purge system primarily comprises an air inlet 72 connected to a pressurized air source 74. At the end of a filter cycle, pressurized air from the air source 74 is introduced into the enclosed space 14 of the vessel 12 to direct any remaining liquid filtrate to the outlet 26.

The scraper 57 is substantially annular in shape and is attached to the end of the inner filter 32 opposite the transfer assembly 46. The scraper 57 extends substantially radially from the inner filter 32 to an outer edge, which is desirably positioned close to, or in contact with, the interior surface of the outer filter 34. Although, the illustrated scraper 57 has a generally convex shape, other suitable configurations of the scraper 57 may also be used in order to perform the desired function. The scraper 57 is preferably constructed from any suitably rigid material, such as metal or plastic. However, other suitable materials may also be used. The scraper 57 may be secured to the inner filter 32 by any suitable means, such as with threaded fasteners, riveting, adhesives, or the like.

At the end of a filtering cycle, when the inner filter 32 is removed from the outer filter 34, the scraper 57 advantageously assists in the removal of the particulate cake from the collection volume 36. Specifically, the outer filter 34 desirably remains fixed within the vessel 12. The inner filter 32 is desirably removed from the filter apparatus 10 through the open end of the vessel 12 and the scraper 57 advantageously moves in a longitudinal direction relative to the outer filter 34. As the scraper 57 moves relative to the outer filter 34, it removes at least a substantial portion of the particulate matter that has accumulated within the collection volume 36 during the filter cycle. This feature reduces the time required to prepare the filter 10 for a subsequent filtering cycle. In another arrangement, the inner filter 32 may remain fixed within the vessel 12 and the scraper 57 may be secured to the outer filter 34 to remove particulate matter from the collection volume 36 upon removal of the outer filter 34 from the vessel 12. In yet another arrangement, both the inner and outer filters 32, 34 may remain within vessel 12 with only the scraper 57 being removed during cleaning of the filter apparatus 10.

The back flush system primarily comprises a back flush liquid inlet 76 connected to a back flush liquid source 78. After the particulate cake is removed from the collection volume 34 (e.g., by the scraper 57), the inner filter 32 is returned to its normal position within the outer filter 34. A back flush liquid, preferably pressurized water, is then introduced into the enclosed space 14 of the vessel 12. The back flush liquid travels through the inner and outer filters 32, 34 in a direction opposite the normal flow path during a filter cycle (i.e., opposite the direction of the arrows in FIG. 4). Thus, the back flush liquid flows from the interior space 42 and the exterior space 44 by passing through the inner filter 32 and outer filter 34, respectively, and into the collection volume 36. The reverse flow of the back flush liquid desirably removes particulate matter remaining on the filter media of the inner and outer filters 32, 34. A valve assembly 80 desirably closes off the pressure source 28 and opens a back flush liquid outlet 82 wherein the back flush liquid and particulate matter may be evacuated from the filter apparatus 10.

Figure 6A:
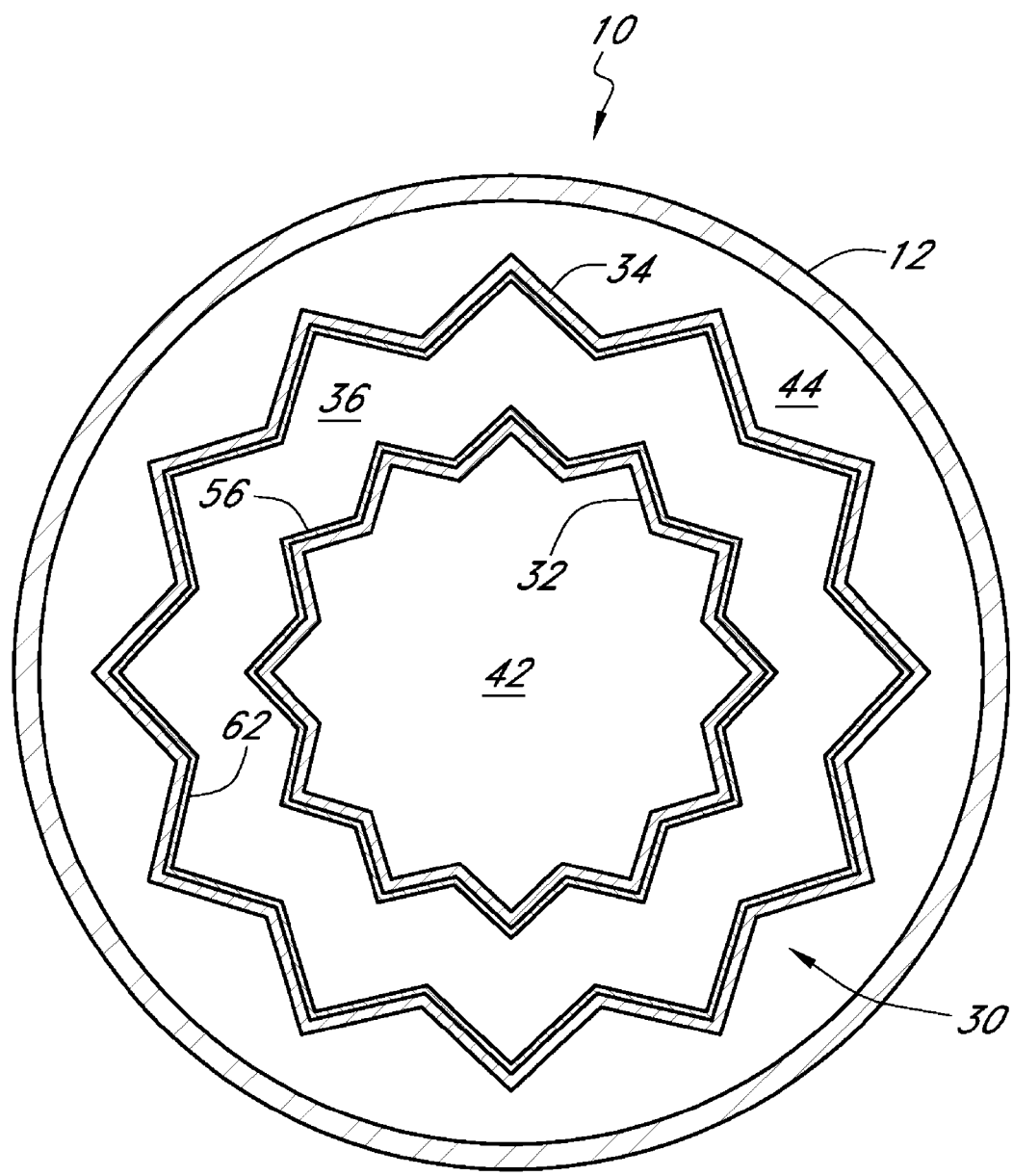
FIG. 6A is a cross section view of an alternative filter assembly wherein the inner and outer filters have a corrugated shape.

FIG. 6A is a cross section view of a filter apparatus 10 illustrating an alternative arrangement of a filter assembly 30. Both the inner and outer filters 32, 34 of the filter assembly 30 are annular in shape, however, each of the filters 32, 34 also possess a corrugated, or pleated, arrangement. The corrugated shape is capable of increasing both the volume of the collection volume 36 and the surface area of the inner and outer filter media 56, 62 within a given size pressure vessel 12. This permits more particulate to be collected within the collection volume 36, and thus more slurry to be processed, than otherwise possible with a similarly sized filter 10 employing a circular cross-section filter assembly 30. The filter assembly may also take on desired cross-sectional shapes, or sizes, other than those disclosed herein.

FIG. 6B is a schematic, cross-sectional view of an alternative filter apparatus 10 utilizing multiple filter assemblies, or filter cells 30. As illustrated in FIG. 6B, a plurality of separate filter cells 30 are positioned concentric with one another within the vessel 12. Desirably, each filter cell 30 includes and outer wall 43, which preferably encloses the cell 30 and separates the cells 30 from one another. In some arrangements, the outer wall 43 may be perforated to permit filtrate to pass through, as is described below. Preferably, each filter assembly 30 is substantially similar to the filter assemblies 30 described above in relation to FIGS. 1-5. Accordingly, each filter assembly 30 of FIG. 6B includes an inner filter 32 and an outer filter 34. A particulate collection volume 36 is defined between each of the inner and outer filters 32, 34. In a manner similar to the embodiments described above, an interior space 42 is defined between the inner filter 32 and the outer wall 43 of the filter cell 30. Similarly, an exterior space 44 is defined between the outer filter 34 and the outer wall 43 of the filter cell 30.

The inner and outer filters 32, 34 may be constructed substantially as described above in relation to FIG. 2. Desirably, each such filter includes a perforated support wall and a suitable filter media, as described above. In such an arrangement, the interior space 42 comprises an outlet space, which communicates with an outlet of the vessel 12, as described above. Alternatively, one or both of the filters 32, 34 may additionally include a mechanical squeeze arrangement in which a flexible bladder, or membrane, is desirably positioned to the side of the filter media opposite the collection volume 36. An exemplary mechanical squeeze arrangement is described below with reference to FIGS. 7-11. The flexible bladder is arranged to impart a squeezing force on the particulate cake at the end of the filter cycle to further dry the cake. In the arrangement if FIGS. 6B-6D, the inner filter 32 is illustrated to include a mechanical squeeze arrangement. In such a configuration, the interior space 42 desirably comprises a hydraulic fluid cavity and an outlet space (not shown) would be defined between the membrane and the filter media, as is described below with reference to FIG. 8. Hydraulic fluid within the cavity may then be pressurized to expand the flexible bladder and impart a squeezing force on the particulate cake.

In operation, the filter apparatus 10 of FIG. 6B functions in a manner similar to the embodiments described above. Slurry is introduced into the particulate collection volume 36 of each filter cell 30, the pressure is increased, and the liquid component of the slurry moves through the filters 32, 34 while the solid particulate is retained within the collection volumes 36. The liquid component of the slurry is forced through the inner and outer filters 32, 34 and into the interior and exterior spaces 42, 44, respectively, assuming that no mechanical squeeze arrangement is present. The interior and exterior spaces 42, 44 are in fluid communication with one or more outlets (not shown) of the filter apparatus 10. The outlets may be in the form of a transfer assembly 46 (FIGS. 1-5) interconnecting the interior space 42 with the exterior space 44 in a manner similar to the embodiments described above, for example. Other suitable arrangements for supplying the slurry to the particulate collection volumes 36 and evacuating the filtered liquid component from the vessel 12 may also be used.

Providing multiple filter assemblies 30 increases the total volume of the particulate collection volume 36 of the filter apparatus 10 while maintaining a desirable distance between the inner and outer filters 32, 34 and, therefore, increases the amount of slurry that can be processed during a single filtering cycle. As will be apparent by one of skill in the art, the number of filter assemblies provided may be varied to suit a particular application.

FIG. 6C is a schematic, cross-sectional view of yet another filter assembly arrangement. The filter assembly of FIG. 6C includes a plurality of linear filter cells 30 that extend generally in a radial direction from the center of the filter apparatus 10. As in the filter assembly 10 of FIG. 6B, each filter cell 30 includes an outer wall 43 that encloses the filter cell 30 and separates the cells 30 from one another. Due at least in part to the cells 30 not being in contact with one another, the outer wall 43 may be perforated to permit filtrate to pass through the outer wall 43 and into the space between the cells 30. Of course, if a mechanical squeeze arrangement is incorporated into a particular cell 30, the outer wall adjacent the membrane, or bladder, would not be perforated so as to define a hydraulic cavity to retain the hydraulic fluid. Further, each filter cell 30 includes a first filter 32 and a second filter 34, which cooperate to define a particulate collection volume 36 between them. Thus, the first and second filters 32, 34 function as the inner and outer filters in the embodiments described above.

In operation, slurry is introduced into the filter assembly 30. The liquid component of the slurry is forced through both the first filter 32 and the second filter 34 of each filter cell 30 and into the interior and exterior spaces 44. As in the previous embodiments, the solid component of the slurry is retained within the particulate collection volume 36. Similar to the embodiment of FIG. 6B, this arrangement also increases the volume of the particulate collection volume 36 within the filter apparatus 10 and, thus, the volume of slurry that may be processed in a single filtering cycle.

FIG. 6D is a schematic, cross-sectional view of still another arrangement of a filter apparatus 10. The filter 10 of FIG. 6D includes a plurality of individual, linear filter cells 30, each having a first filter 32 and a second filter 34. The first and second filters 32, 34 define a particulate collection volume 36 within each of the individual filter cells 30. Again, the first and second filters 32, 34 of the filter assembly 30 of FIG. 6D function in a similar manner to the inner and outer filters of the embodiments described above with relation to FIGS. 1-5.

If desired, a mechanical squeeze arrangement may also be incorporated into the filter cells 30 of FIG. 6D.

As illustrated in FIG. 6D, several lengths of filter cells 30 are provided to substantially fill the available space within the vessel 12. Alternatively, the filters 35 may be of a single length (e.g., a similar length to the shortest illustrated filter cells 30) and simply arranged to most efficiently utilize the space within the vessel 12. In another arrangement, the individual filter cells 30 may be connected with one another to form a single particulate collection volume 36. For example, each filter cell 30 may be connected to the filter 35 adjacent to it, thereby connecting the particulate collection volumes 36 defined by each of the filters 35.

As in the arrangements of FIGS. 6A-6C, slurry is introduced into the particulate collection volume 36 within each of the filter cells 30 of FIG. 6D. The liquid component of the slurry is forced through the first and second filters 32, 34 and into the interior and exterior spaces 42, 44, respectively. From the interior and exterior spaces 42, 44, the liquid component is evacuated from the vessel 12 in a suitable manner, such as those described above.

As will be readily determined by one of skill in the art, the filter assemblies 30 described above in relation to FIGS. 6A-6D are merely exemplary arrangements. Accordingly, the filter assembly 30 may be modified from those illustrated to suit a particular application. In addition, various suitable methods for introducing the slurry to the particulate collection volume 36 may be utilized, including, but not limited to, those described above in relation to FIGS. 1-5. Furthermore, each of the illustrated filter assembly 30 arrangements may utilize other features described in relation to FIGS. 1-5, as well as the automatic features described below, as may be determined by one of skill in the art. Advantageously, any of the embodiments illustrated in FIGS. 6A-6D may include a scraper to permit automatic removal of particulate cake from within the particulate collection volume, as will be readily determined by one of skill in the art.

Figure 7:
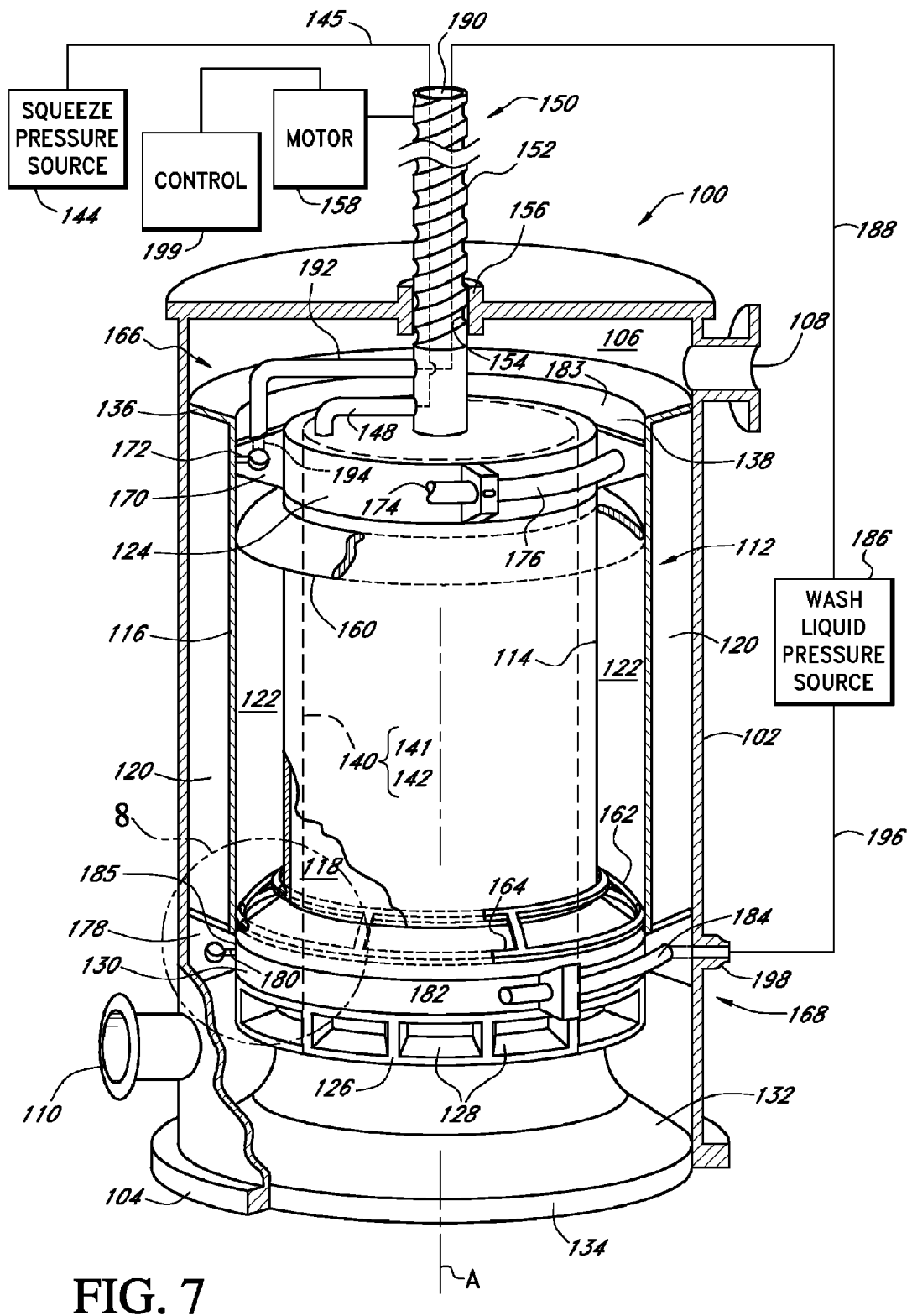
FIG. 7 is a perspective view of an automatic embodiment of a filter assembly. Portions of the filter assembly are cutaway to illustrate various internal components.

FIG. 7 illustrates an automatic embodiment of a filter apparatus 100. The automatic filter 100 is constructed in a similar manner to the embodiments described above with reference to FIGS. 1-5 and operates to filter particulate matter from a slurry in a similar manner. However, the filter 100 advantageously includes features that permit the filter 100 to automatically discharge at least a substantial portion of the particulate cake and prepare the filter media for further use. Thus, the automatic filter 100 is more efficient and requires less operator time for cake discharge and cleaning in comparison with previously described embodiments and, as a result, is less expensive to operate.

The illustrated filter 100 includes a cylindrically shaped vessel 102 which is closed at its upper end and open at its lower end. The lower end of the vessel 102 terminates in a flange 104, which extends in an outward direction, generally transverse to the cylindrical wall of the vessel 102. The vessel 102 defines an enclosed space, generally identified by the reference numeral 106. As in the embodiments above, the vessel 102 includes an inlet 108 in an outlet 110, which permit liquid to enter and exit the enclosed space 106 of the vessel 102, respectively.

A filter assembly 112 is positioned within the enclosed space 106 between the inlet 108 and the outlet 110. The filter assembly 112 includes an inner filter 114 surrounded by an outer filter 116. In the illustrated embodiment both the inner filter 114 and the outer filter 116 are substantially cylindrical in shape, however, other suitable shapes may also be used. An interior space 118 is defined within the inner filter 114 and an exterior space 120 is defined between the outer filter 116 and the interior surface of the vessel 102. The inner filter 114 and the outer filter 116 define an annular collection volume 122 between them.

An end cover 124 is attached to the upper end of the inner filter 114 to close off the upper end of the interior space 118. Similar to the embodiments above, a transfer assembly 126 is attached to the lower end of the inner filter 114. A plurality of channels 128 connect the interior space 118 and the exterior space 120 to permit fluid to pass from the interior space 118 to the exterior space 120. An end cover, or base portion 130, of the transfer assembly 126 closes the lower end of the collection volume 122. Optionally, the end cover 130 may be a separate piece from the transfer assembly 126. An inner filter base 132 is connected to the lower end of the transfer assembly 126 and closes off the open, lower end of the vessel 102. The inner filter base 132 includes a seal surface 134 that engages the interior surface of the vessel 102 to create a substantially fluid-tight seal therebetween. Optionally, a seal member, such as an O-ring, may be used to create a seal between the inner filter base 132 and the vessel 102. Other suitable arrangements to prevent fluid from entering or exiting the enclosed space 106, except through the inlet 108 or outlet 110 may alternatively be employed.

Desirably, the outer filter 116 includes a flange 136 attached to its upper end. An upper end of the flange 136 extends generally transversely to the outer filter 116 and engages the interior surface of the vessel 102 at a position below the inlet 108. The flange 136 closes the upper end of the exterior space 120 and desirably creates a fluid-tight seal between the outer filter 116 and the interior surface of the vessel 102. Alternatively, a seal member may be positioned between the flange 136 and the vessel 102 to provide a seal between the outer filter 116 and the vessel 102.

In a similar manner to the embodiments described above, a slurry is introduced into the enclosed space 106 of the vessel 102 through the inlet 108. The slurry is prevented from entering either the interior space 118 or the exterior space 120 by the end cover 124 and flange 136, respectively, and therefore enters a passage 138 defined between the end cover 124 and the flange 136. The slurry passes through the passage 138 into the collection volume 122. Once the collection volume 122 is substantially filled, the supply pressure of the slurry is gradually increased, as described above in relation to the embodiment of FIGS. 1-5. In response to this increased pressure, a liquid component of the slurry is forced through the inner and outer filters 114, 116 while the solid, particulate component is retained within the collection volume 122. Liquid passing through the inner filter 114 enters the interior space 118 and passes through the channels 128 of the transfer assembly 126 and into the exterior space 120. Liquid moving through the outer filter 116 moves directly into the exterior space 120. Liquid in the exterior space 120 then exits from filter 100 through the outlet 110. The filter cycle desirably continues until the collection volume 122 is substantially filled with solid particulate matter, or cake.

Figure 9:
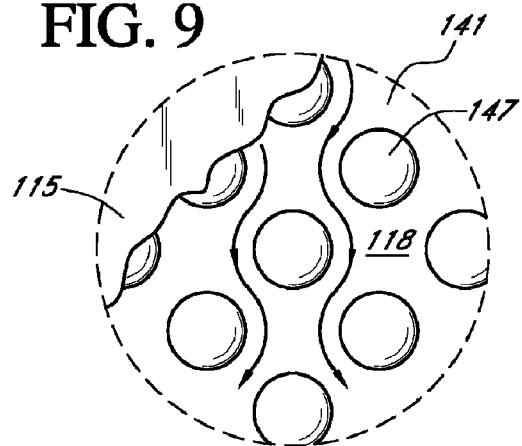
FIG. 9 is a plan view of a portion of the filter assembly of FIG. 7, taken along the view line 9-9 of FIG. 8.
Figure 8:
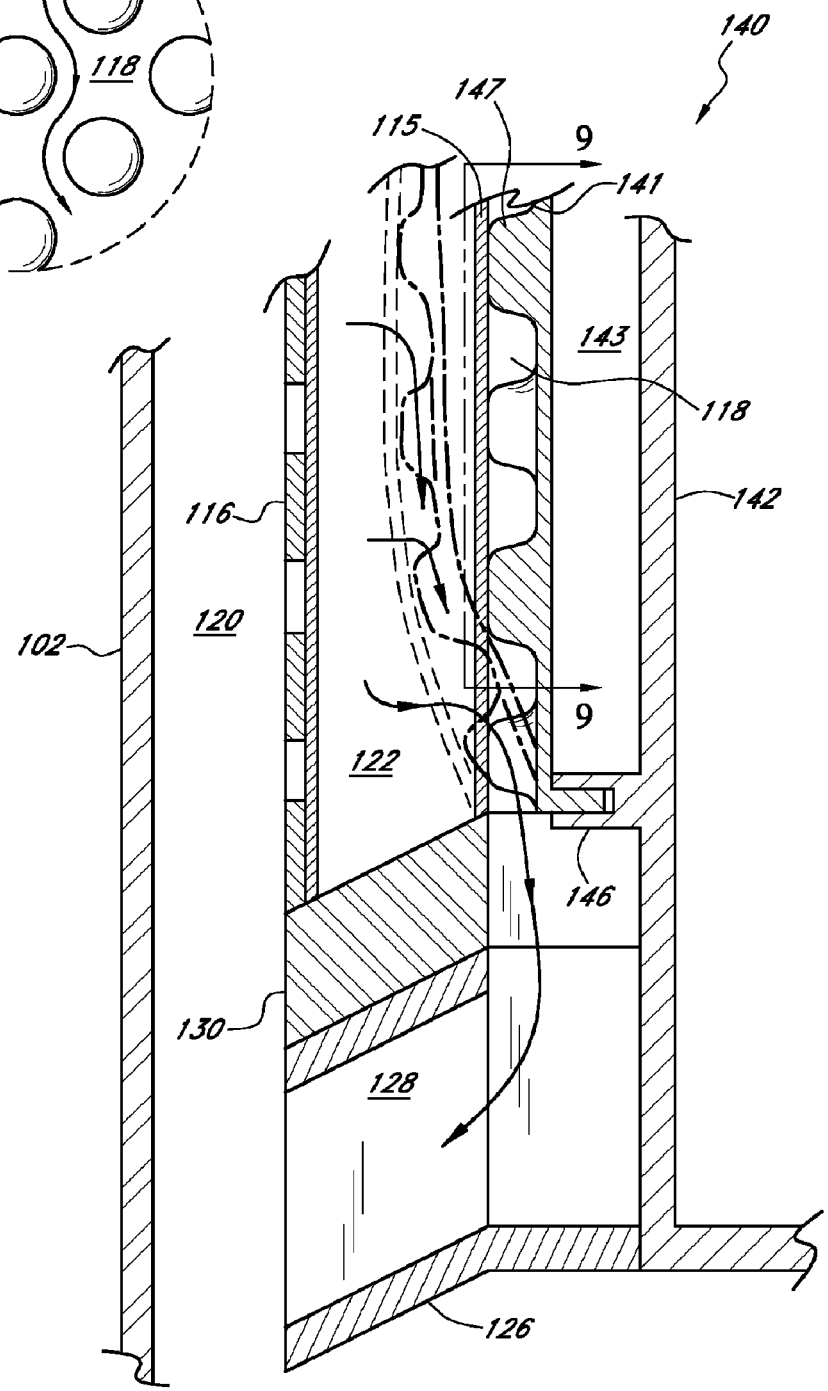
FIG. 8 is a cross sectional view of a portion of the filter assembly of FIG. 7, illustrating a mechanical squeeze assembly.

With additional reference to FIGS. 8 and 9, the filter 100 desirably includes a mechanical squeeze arrangement 140 for applying a squeezing pressure to the particulate cake to further remove liquid from the collection volume 122 at the end of a filtering cycle. In the illustrated embodiment, the mechanical squeeze arrangement 140 includes a flexible bladder 141 and a support member 142 positioned within the annular inner filter 114. The bladder 141 and support member 142 define a fluid chamber 143 between them. A squeeze pressure source 144 is connected for fluid communication with the chamber 143 by a suitable delivery channel 145 (FIG. 7). The pressure source 144 is configured to provide a pressurized flow of fluid to the chamber 143 to expand the bladder 141 and thus squeeze the particulate cake. The relative position of the squeeze arrangement 140, namely the bladder 141 and support member 142, is illustrated in phantom in FIG. 7.

The support member 142 is substantially cylindrical in shape and is positioned generally concentrically within the inner filter 114. Desirably, the support member 142 extends substantially the entire length of the inner filter 114. The support member 142 is preferably constructed from a suitably rigid material to withstand the pressures generated by the squeeze arrangement 140. For example, the support member 142 may be made from any type of suitable steel, alloy, plastic, or composite material. Other suitable materials, or combination of materials may also be used.

The support member 142 includes a grooved flange 146 extending generally transverse to the cylindrical wall of the support member 142. The flange 146 is desirably positioned proximate the lower end of the inner filter 114. The bladder 141 is also cylindrical in shape and surrounds the support member 142. A lower end of the bladder 141 is received by the grooved flange 146 and may be secured in place by any suitable means, such as mechanical fasteners, adhesives, or the like. Although not shown, an upper end of the bladder 141 may be secured to the support member 142 in a similar manner. Alternatively, other suitable methods of securing the bladder 141 to the support member 142, or otherwise creating a chamber 143 between them, may also be used.

An outer surface of the bladder 141 desirably includes a plurality of raised portions, or projections 147. In the illustrated embodiment, the projections 147 are substantially cylindrical in shape and extend radially outward from the outer surface of the bladder 141. The projections 147 space the inner filter media 115 from the cylindrical wall of the bladder 141. Liquid passing through the inner filter media 115 is able to flow downward in the space defined between the projections 147 (illustrated by the arrows in FIG. 9) and into the channels 128 of the transfer assembly. Thus, when a mechanical squeeze assembly 140 is employed, the interior space 118 within the inner filter 114 is primarily defined by the space between the projections 147 and is substantially annular, rather than cylindrical as in the embodiments of FIGS. 1-6.

With additional reference to FIG. 7, the delivery channel 145 for supplying pressurized fluid to the chamber 143, desirably passes through the internal passage 180 of the screw 142. A transfer pipe 148 defines a portion of the delivery channel 145 between the internal passage 180 and the chamber 143 (FIG. 8). Desirably, the chamber is substantially sealed with the exception of the delivery channel 145. This may be accomplished by the grooved flange arrangement, as described above, or by other suitable constructions or methods.

At the completion of a filter cycle, the squeeze pressure source 144 is desirably automatically activated to supply a pressurized fluid to the chamber 143. Due to the rigid nature of the support member 142, the flexible bladder 141 advantageously expands in response to the pressurized fluid being introduced into the chamber 143 (as illustrated in phantom in FIG. 8). The bladder 141 applies a squeezing pressure to the particulate cake against the resistance of the rigid, outer filter 116, thereby reducing the volume of the particulate volume 122. This mechanical squeezing of the particulate cake removes a substantial portion of the liquid otherwise remaining within the particulate cake after the displacement filter process. For example, a filter 100 utilizing a mechanical squeeze arrangement 140 may typically produce a particulate cake that is 50-70% dry in a filter cycle time equal to or less than a displacement filtering process without a mechanical squeeze step.

Desirably, the mechanical squeeze arrangement 140 utilizes a relatively incompressible fluid, such as hydraulic fluid or water and the squeeze pressure source 144 comprises a positive displacement pump. However, a pneumatic squeeze arrangement or other suitable fluids and/or pressure sources may also be used. Desirably, the squeeze pressure source 144 is capable of creating a pressure within the chamber 143 of between approximately 10 and 15,000 psi. Preferably, the squeeze pressure source 144 is capable of creating a pressure within the chamber 143 of between approximately 25 and 10,000 psi and more preferably approximately 300 psi. Additionally, the mechanical squeeze arrangement 140 may be configured for use with any of the filter apparatus embodiments disclosed herein.

Other techniques may be employed along with, or alternative to, the mechanical squeeze arrangement 140. For example, a vacuum may be applied during the filtering process to further aid in removing liquid from the particulate collection volume 122, resulting in a dryer particulate cake C at the end of the filter cycle. Similarly, heat may be applied to the particulate collection volume 122 to aid in evaporation of the liquid therein and, thus, increase the dryness of the cake C. Additionally, an air purge (or other gaseous medium) system may be provided to introduce air (or gas) to the particulate collection volume 122 after the filter cycle, to further assist drying of the particulate cake C. As will be apparent to one of skill in the art, any of the above-described cake drying techniques or systems may be used along, or in conjunction with one another, to achieve a desired dryness percentage of the particulate cake C.

As mentioned above, the filter 100 also desirably includes features which permit cleaning and preparation of the filter 100 for further use automatically at the end of a filter cycle. Desirably, the filter 100 includes a filter closure assembly 150, or drive, which is operable to move the inner filter 114 with respect to the outer filter 116 and vessel 102 along a longitudinal axis A of the filter 100 to permit particulate to be discharged from the collection volume 122. In the illustrated embodiment, the filter closure assembly 150 includes a threaded screw 152 rotatably coupled to the inner filter 114. The screw 152 extends in an upward direction from the inner filter 114 through an aperture 154 in the closed end of the vessel 102. In the illustrated embodiment, the aperture 154 is defined by an internally threaded collar 156. External threads of the screw 152 mate with the internal threads of the collar 156 such that rotation of the screw 152 causes it to move axially with respect to the vessel 102 and thereby move the inner filter 114 along the longitudinal axis A. Desirably, the screw 152 is able to rotate with respect to the inner filter 114 so that rotation of the screw 152 only results in axial movement of the inner filter 114 without causing rotation of the inner filter 114. A drive device, or motor 158, is desirably connected to the screw 152 to selectively impart rotational motion thereon. Alternatively, other suitable drive arrangements may also be used, such as a telescoping rod arrangement as described below with reference to FIG. 12, for example.

The filter 100 also desirably includes an upper scraper 160 attached to the inner filter 114 at a position near the upper end of the collection volume 122. Desirably, the upper scraper 160 is substantially annular in shape and includes a peripheral edge which is spaced at least slightly from the interior surface of the outer filter 116 in order to permit slurry to pass from the passage 138, past the upper scraper 160 and into the collection volume 122. Desirably, the filter assembly 112 also includes a lower scraper 162 connected to a lower end of the outer filter 116 such that it is positioned at a lower end of the collection volume 122. The lower scraper 162 is also desirably annular in shape and includes a plurality of passages 164 extending axially through the scraper 162. The inner peripheral edge of the lower scraper 162 may be positioned close to or touching the exterior surface of the inner filter 114. Thus, particulate matter, or cake, within the collection volume 122 may be discharged through the passages 164 in the lower scraper 162. Alternatively, the upper scraper 160 may include one or more passages, similar to the passages 164 of the lower scraper 162, to permit slurry to pass into the collection volume 122 and the outer peripheral edge may be positioned close to or touching the outer filter 116.

Advantageously, the filter 100 also includes a filter spray wash arrangement for spraying a fluid, such as water or other type of cleaner, onto the surfaces of the inner and outer filters 114, 116. The spray wash arrangement includes an upper spray assembly 166 and a lower spray assembly 168. The upper spray assembly 166 includes one or more spray nozzles 170 attached to and spaced around the circumference of the end cover 124. Thus, the upper nozzles 170 are fixed for movement with the inner filter 114. Each of the upper nozzles 170 include an outlet 172 arranged to spray liquid in a radial direction toward the outer filter 116. The upper spray nozzles 170 are interconnected by an upper feed channel 174 defined at least in part by a tube 176.

Similarly, the lower spray assembly 168 includes one or more lower nozzles 178 which are connected to, and arranged around the circumference of, the interior surface of the vessel 102. Each of the lower nozzles 178 includes an outlet 180 which is arranged to spray a wash liquid in a radial directly toward the inner filter 114. The nozzles 178 are interconnected by a lower nozzle feed channel 182 defined at least in part by a tube 184. Advantageously, both the upper and lower spray nozzles 170, 178 are arranged such that their respective outlets 172, 180 are covered while slurry is being filtered. This feature prevents particulate in the slurry from clogging or otherwise damaging the outlets 172, 180. As illustrated, the outlets 172 of the upper spray nozzles 170 are covered by an inner surface 183, or cover, of the flange portion 136 of the outer filter 116. Similarly, the outlets 180 of the lower spray nozzles 178 are covered by an outer surface 185, or cover, of the base portion 130 of the inner filter 114. Alternatively, other suitable arrangements may be employed to cover, or otherwise protect, the outlets 172, 180 while the filter 100 is in a closed position and in a filtering mode.

Both the upper spray assembly 166 and the lower spray assembly 168 are connected to a wash liquid pressure source 186. The pressure source 186 supplies a pressurized wash liquid, such as water, a water/detergent mixture, an acid wash, or other suitable cleaning fluid, at a pressure sufficient to remove particulate matter from the inner and outer filters 114, 116. An upper delivery channel 188 connects the pressure source 186 to the upper nozzle feed channel 174. Desirably, the upper delivery channel 188 passes through an internal passage 190 defined by the hollow interior of the screw 152. A transfer pipe 192 defines a portion of the upper delivery channel extending from the internal passage 190 to the upper nozzle feed channel 174. Desirably, the transfer pipe 192 terminates at one of the upper nozzles 170 where an aperture 194 defines a portion of the upper delivery channel 188 that opens into the upper nozzle feed channel 174. A lower delivery channel 196 connects the pressure source 186 to the lower spray assembly 168. An aperture 198 passes through the vessel 102 and one of the lower nozzles 178 to connect the lower delivery channel 196 to the lower nozzle feed channel 182.

Desirably, the filter apparatus 100 includes a controller 199 connected to one or more components or systems of the filter 100 for selectively controlling at least a portion of the operational sequence of the filter 100. Preferably, as illustrated in FIG. 7, the controller 199 is connected to the motor 158 to selectively actuate the motor 158 to control the movement of the inner filter 114 between the open and closed positions. Although not shown, the controller 199 may also be connected to the squeeze pressure source 144 and the wash liquid pressure source 186 to control operation of those components, as will be described below. The controller 199 may comprise any type of suitable controller, including a dedicated controller or a controller configured to process software code, for example, and desirably comprises a memory component. Alternatively, the controller 199 may comprise a plurality of individual controllers connected to specific components of the filter 100. The controller 199 may also include any number of suitable sensors, such as position or pressure sensors, to assist in the operational control of the filter 100, as may be determined by one of skill in the art.

Figure 10:
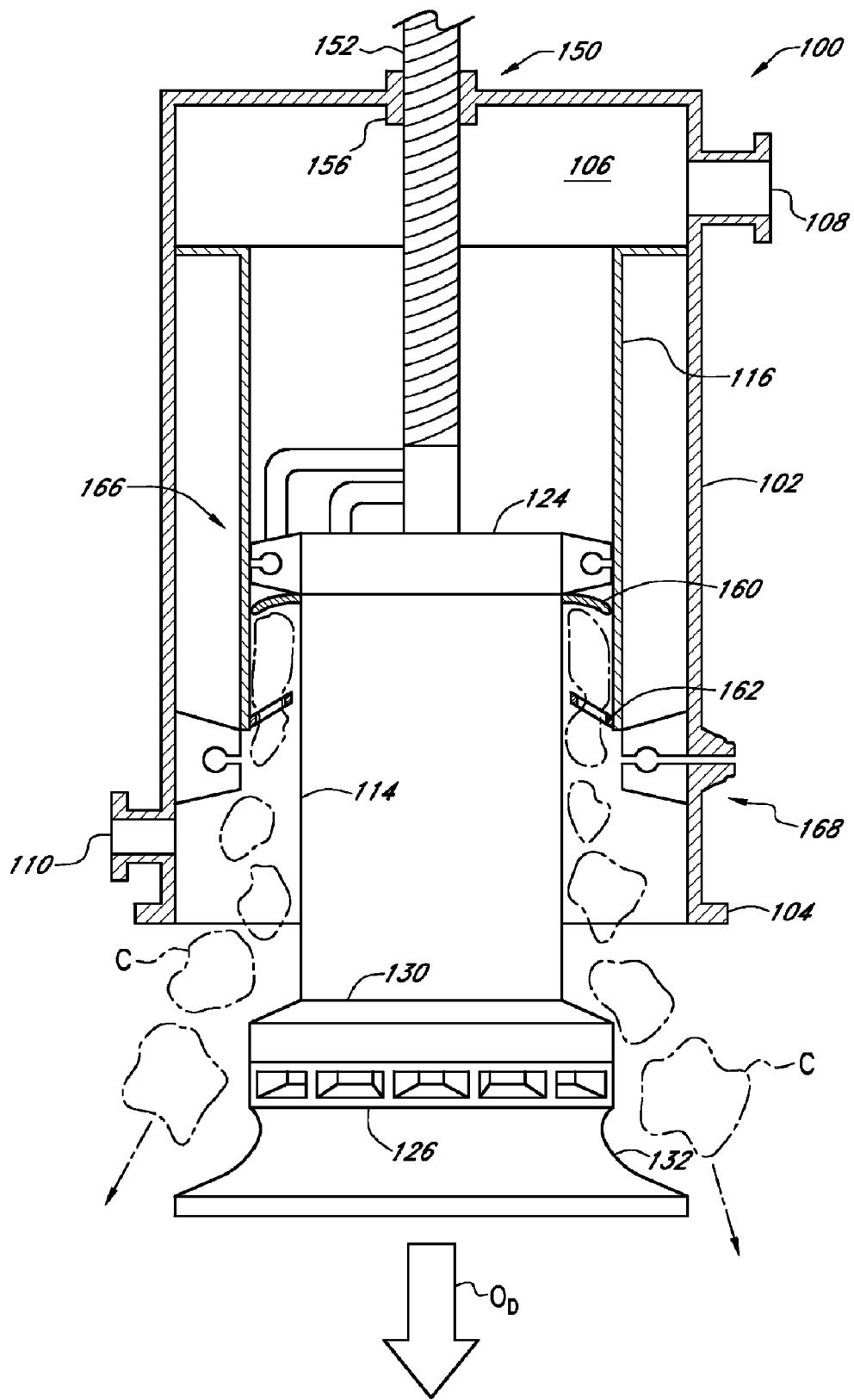
FIG. 10 is a schematic cross sectional view of the filter assembly of FIG. 7 in a particulate cake discharge mode.

As described above, at the end of a filter cycle, the collection volume 122 is substantially filled with particulate matter. During the filter cycle, the filter 100 is in a closed position substantially as illustrated in FIG. 7. With reference to FIG. 10, once a filter cycle has been completed, the filter closure assembly 150 operates to open the filter 100 so that the particulate matter within the collection volume 122 may be discharged. Specifically, the motor 158 operates to rotate the screw 152 which results in the inner filter 114 lowering with respect to the vessel 102 (and the outer filter 116) along the longitudinal axis A of the filter 100, as demonstrated by the arrow $O_D$ of FIG. 10. Although the filter 100 is substantially symmetrical about the longitudinal axis A, other non-symmetrical filter shapes may also be employed while still defining a longitudinal axis A. That is, the longitudinal axis A is a line that extends generally lengthwise along the filter apparatus and symmetry is not required for a specific embodiment to define a longitudinal axis A.

As the inner filter 114 lowers with respect to the outer filter 116 the upper scraper 160 and lower scraper 162 assist in removing particulate cake C from the collection volume 122. A lower surface of the upper scraper 160 engages the particulate cake C and forces it downward through the passages 164 of the lower scraper. The particulate cake is then assisted by gravity out of the filter 100 through the open lower end of the vessel 102. Advantageously, an outer peripheral edge of the upper scraper 160 assists in removing particulate cake C from on or proximate the interior surface of the outer filter 116. Similarly, an inner peripheral surface of the lower scraper 162 assists in removing particulate cake on or proximate to the exterior surface of the inner filter 114. In this manner, a substantial portion of the particulate cake C may be automatically removed from the collection volume 122.

Once the particulate cake C has been substantially discharged from the collection volume 122, the motor 158 reverses to turn the screw 152 in an opposite direction thereby moving the inner filter 114 in an upward direction, returning it to a position within the vessel 102. Desirably, the inner filter 114 is returned substantially to its closed positioned, as illustrated in FIG. 7. Preferably, the inner filter 114 is moved upward to at least a position wherein the outlets 172 of the upper nozzles 170 are substantially aligned with the uppermost portion of the outer filter 116.

Figure 11:
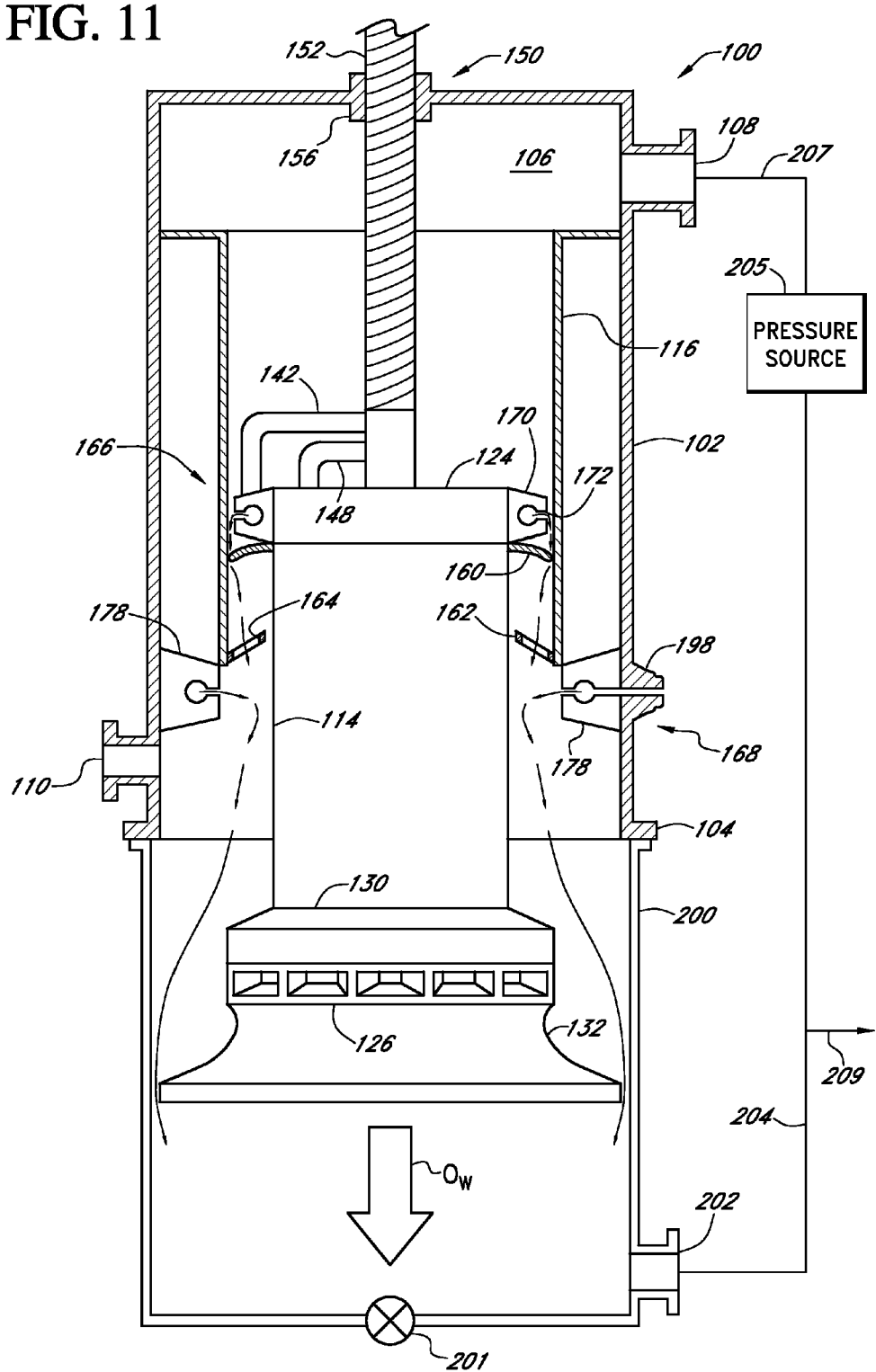
FIG. 11 is a schematic cross sectional view of the filter assembly of FIG. 7 in a filter media wash mode.

With reference to FIG. 11, the filter 100 desirably begins a filter wash mode after the particulate cake C has been discharge by the preceding process. Desirably, a catch basin 200 is moved to a position under the filter 100. The catch basin 200 is preferably sized and shaped to contact the flange 104 of the vessel 102 about its entire circumference. In an alternative arrangement, the catch basin 200 may remain in a fixed position under the filter 100, or may be unitarily formed with the vessel 102. In such an arrangement, preferably, a valve 201 is provided in a bottom surface of the catch basin 200 to selectively permit particulate cake C to be discharge from the basin 200 and, in another mode, retain wash liquid so that it passes to the outlet 202.

The wash liquid pressure source 186 is activated to supply a pressurized wash liquid to the upper and lower spray assemblies 166, 168 through the upper and lower delivery channels 188, 196, respectively. Pressurized water is discharged from the upper nozzles 170 of the upper spray assembly 166 toward the interior surface of the outer filter 116. Preferably, the upper nozzles 170 and nozzle outlets 172 are arranged such that the wash liquid contacts substantially the entire circumference of the outer filter 116. Similarly, wash liquid is sprayed from the outlets 180 of the lower spray nozzles 178 toward the exterior surface of the inner filter 114. Preferably, substantially the entire circumference of the inner filter 114 is contacted by wash liquid emitted from the lower nozzles 178. Desirably, the wash liquid pressure source 186 supplies wash liquid at a pressure sufficient to substantially remove particulate matter from the filters 114, 116. Desirably, the pressure source 186 provides wash liquid at a pressure from approximately 5 psi to 10,000 psi. Preferably, the pressure source 186 provides wash liquid at a pressure from approximately 10 psi to 5,000 psi and, more preferably, approximately 1200 psi.

Once the pressure source 186 has been activated and wash liquid is being sprayed from the upper and lower spray assemblies 166, 168, the filter closure assembly 150 operates to lower the inner filter 114, as indicated by the arrow $O_W$ in FIG. 11. As the inner filter 114 moves downward, the wash liquid being sprayed from the upper spray assembly 166 advantageously removes substantially any particulate matter remaining on the outer filter 116. The wash liquid and particulate then move downward through the gap between the upper scraper 160 and the outer filter 116. Alternatively, the upper scraper 160 may be positioned above the spray nozzles 170.

The wash liquid and particulate continue to move downward through the passages 164 of the lower scraper 162 and into the catch basin 200. Likewise, the wash liquid being sprayed from the lower spray assembly 168 washes substantially any remaining particulate from the inner filter 114 and the wash liquid and particulate move downwardly into the catch basin 200. From the catch basin, the wash liquid and particulate are desirably evacuated from the catch basin through an outlet 202 and back into the system via return line 204. It is then readmitted to the filter 100 along with other unfiltered slurry by slurry pressure source 205 through supply line 207. Alternatively, the wash liquid may be directed to a drain line 209.

Figure 12:
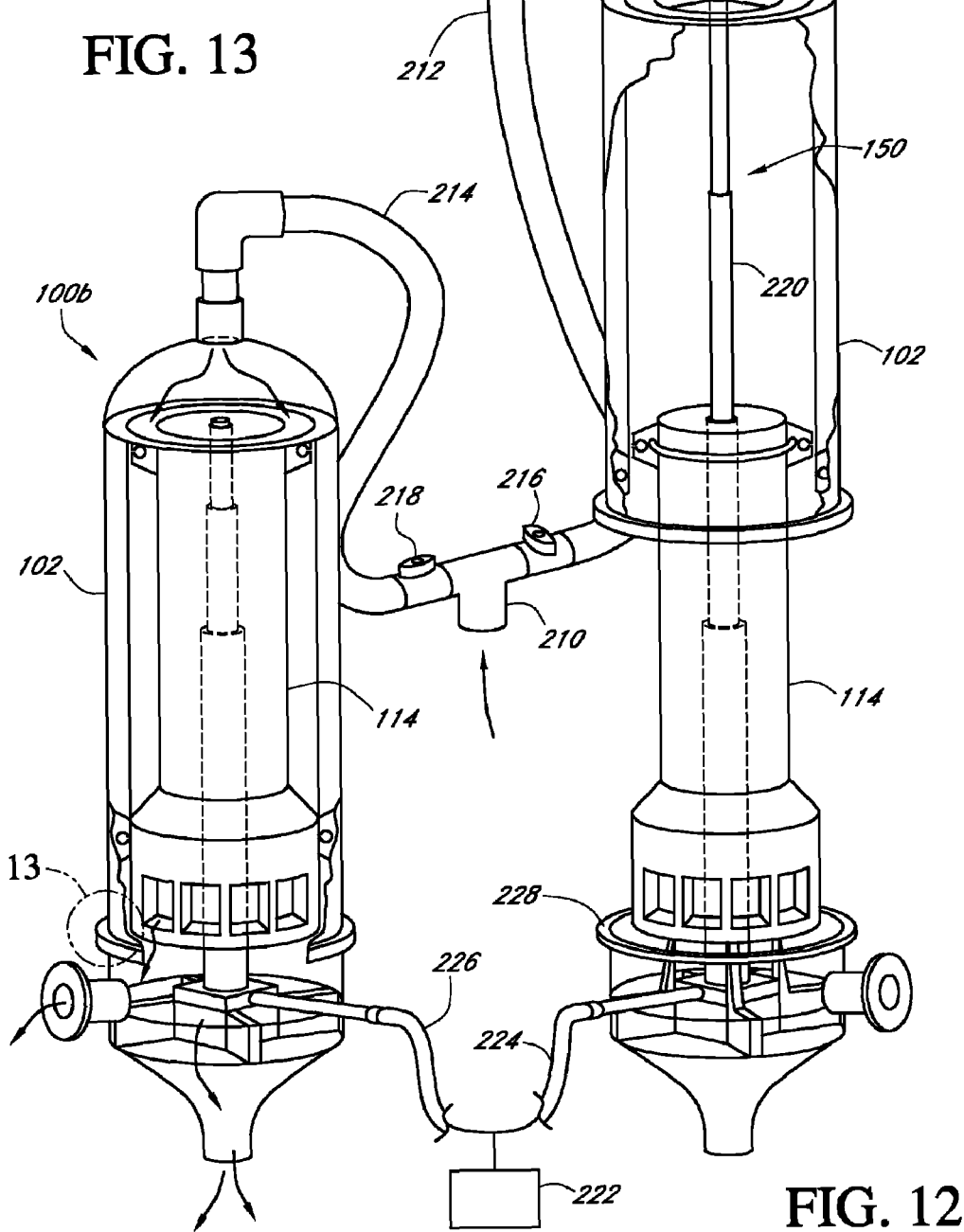
FIG. 12 is a perspective view of a modification of the automatic filter of FIG. 7 utilizing a pair of interconnected filters. In the embodiment of FIG. 12, the vessel is lifted from the inner filter by a telescoping rod arrangement to permit discharge of particulate cake.

FIG. 12 illustrates an alternative embodiment comprised of a pair of filters 100 connected to a common supply channel at least partially defined by a tube 210, which selectively supplies slurry to either, or both, of the filters 100a, 100b. The supply line 210 splits into a first branch 212 which supplies slurry to the first filter 100a and a second branch 214 which supplies slurry to the second filter 100b. A first valve 216 and a second valve 218 operate to control the supply of slurry to the first branch 212 and second branch 214, respectively. Although two filters 100 are illustrated, any suitable number may be provided.

The filters 100a, 100b of FIG. 12 are arranged such that the inner filter 114 remains stationary and the filter closure assembly 150 operates to lift the vessel 102 upward with respect to the inner filter assembly 114. The filter closure assembly 150 of filters 100a, 100b comprises a telescoping rod arrangement 220. The rod may be hydraulic or pneumatic and is supplied with a fluid from a fluid supply source 222 through first and second supply lines 224, 226, respectively. The individual filters 100a, 100b preferably operate in a similar manner to those filter embodiments previously described. The filters 100a, 100b are preferably automatic, similar to the embodiment of FIGS. 7-11, but may alternatively include any desirable combination of automatic features described above.

Figure 13:
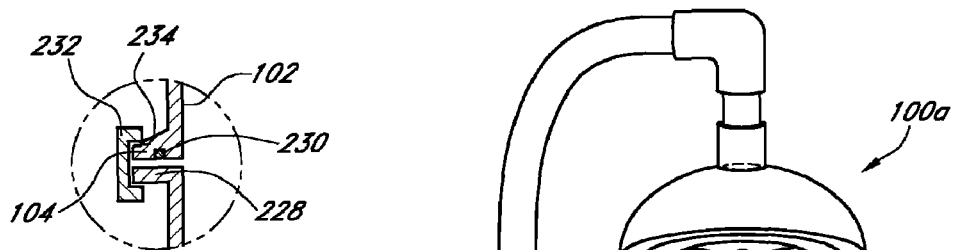
FIG. 13 is a cross sectional view of a connection assembly between a vessel portion and an inner filter portion of the filter of FIG. 12.

With reference to FIG. 13, the vessel 102 and the inner filter 114 are selectively secured, and preferably sealed, to one another by a segmented flange and ring assembly, as is known in the art. Specifically, the inner filter base 132 of filters 100a, 100b includes a flange 228, which is sized and shaped to mate with flange 104 of vessel 102. Preferably, at least the flange 104 includes a plurality of interrupted areas spaced around its circumference. A clamp member 232, or clamp ring, operates to exert a closing pressure on the flanges 104, 228 thus squeezing them together. Desirably, the clamp ring 232 includes a plurality of segments around its circumference, which are sized and shaped to pass through the interrupted areas of the flange 104. Thus, when the segments of the clamp ring 232 are aligned with the interrupted areas of the flange 104, the vessel 102 may be lifted upward and away from the inner filter 114 to open the filter assembly 100a, 100b. Desirably, the flange 104 and/or the clamp ring 232 includes a cam surface 234 such that rotation of the clamp ring 232 increases the squeezing force on the flanges 104, 228. Desirably, a seal member 230, such as an O-ring, is positioned between the two mating surfaces of the flange 230 and flange 104 to create a seal therebetween. In the illustrated embodiment, the seal member 230 is retained within a groove defined by the flange 104 of the vessel 102. However, the seal member 230 may alternatively be affixed to the flange 228 of the inner filter base 132. Alternatively, other suitable sealing arrangements may also be used.

Figure 14:
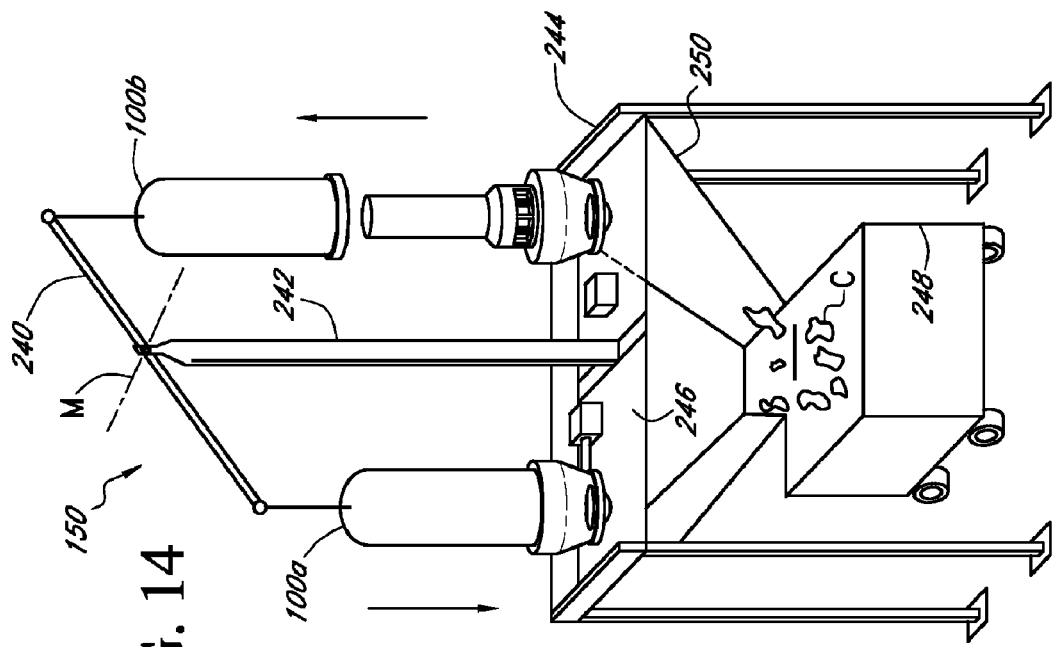
FIG. 14 is a perspective view of an alternative arrangement of an automatic filter system utilizing a pair of filters.

FIG. 14 illustrates an alternative filter arrangement wherein, similar to the embodiment of FIG. 12, the vessel 102 and outer filter 116 are moved in an upward direction with respect to the inner filter 114 to allow particulate to be removed from the collection volume 122. In the arrangement of FIG. 14, the respective vessels 102 of the pair of filters 100a, 100b are interconnected by the filter vessel lift assembly 150. The lift assembly 150 includes a lever arm 240 to which the respective vessels 102 of the filters 100a, 100b are rotatably coupled on opposing ends. The lever arm 240 is rotatably coupled to a vertical support 242 at approximately the mid-point of the lever arm 240 such that rotation of the lever arm 240 about the axis M causes the vessel 102 of one filter 100a, 100b to move in an upward direction, while the vessel 102 of the opposing filter 100a, 100b moves in a downward direction. Thus, rotation of the lever arm 240 closes one filter (100b in FIG. 12), while opening the other filter (100a in FIG. 12). Alternatively, the lift assembly 150 may be arranged to permit independent movement of the vessels 102.

In the illustrated embodiment, the filters 100a, 100b are mounted to a support structure, such as a platform, or bench 244. Preferably, the horizontal portion of the bench 244 includes one or more passages 246 which permit particulate cake to empty from the filters 100a, 100b and pass into a receptacle, such as a bin or cart 248, positioned underneath the bench 244. Optionally, a chute 250 may direct the particulate cake into the cart 248.

In this embodiment, filter 100a is illustrated in a filtering mode and filter 100b is illustrated in a cleaning mode. When filter 100a is substantially filled with particulate matter, the lever 240 will be rotated about the axis M such that filter 100a is opened and filter 100b is closed. Particulate may then be emptied from filter 100a while filtering of slurry takes place in filter 100b. Thus, if connected to a single slurry source, the pair of filters 100a, 100b are arranged such that slurry can be continuously filtered.

Figure 17:
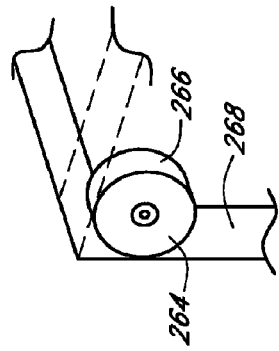
FIG. 17 is an enlarged perspective view of a idler wheel of the filter closure arrangement of FIG. 15.
Figure 16:
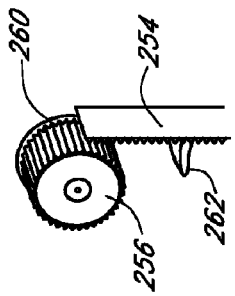
FIG. 16 is an enlarged perspective view of a drive wheel of the filter closure arrangement of FIG. 15.
Figure 15:
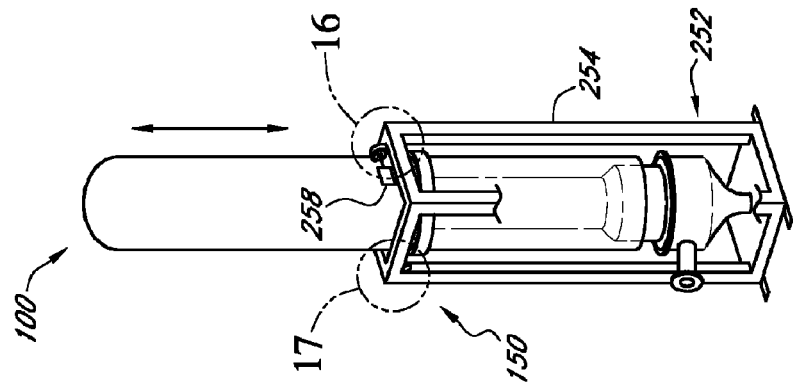
FIG. 15 is a perspective view of an automatic filter assembly utilizing an alternative embodiment of a filter closure arrangement.

FIG. 15 illustrates an embodiment of a filter 100 which utilizes an alternative lifting arrangement 150. The lifting arrangement 150 includes a frame 252 surrounding the filter 100. The frame 252 is desirably square in horizontal cross-section and includes four vertical support posts 254 (only three shown), with one post 254 being positioned at each corner. With additional reference to FIG. 16, a drive gear 256 is connected to the vessel 102 of filter 100 and is driven by a motor 258. Teeth 260 formed on the drive gear 256 mesh with teeth 262 of the corresponding post 254. With additional reference to FIG. 17, an idler wheel 264 is attached to the vessel 102 at each of the other three post 245. A smooth surface 266 of the idler wheel 264 rolls against a smooth surface 268 of the post 245 and assists in maintaining a vertical orientation of the vessel 102. Thus, the motor 258 rotates the drive gear 256 to move the vessel 102 (and outer filter) axially with respect to the inner filter 114, as illustrated by the arrow of FIG. 13, to move the filter between an open and a closed position. Alternatively, more than one drive gear 256 may be provided.

Although the present invention has been described in the context of several preferred embodiments, modifications and rearrangements of the illustrated embodiments may be made without departing from the spirit and scope of the invention. For example, but without limitation, both the vessel and the filter assembly may take on other forms or shapes. Additionally, any or all of the automated features to assist in the filtering or cleaning process may be incorporated on any of the filter embodiments disclosed herein, or on other suitable variations of the filter apparatus. Further, the sequence of operation of the filter apparatus may be varied from the order described herein. Other modifications obvious to one of skill in the art may also be made. Accordingly, the scope of the present invention is to be defined only by the appended claims.

What is claimed is:
1. A method of separating particulate matter from a slurry, comprising;
   providing a filter apparatus comprising a pressure vessel having a first end, a second end, and a substantially cylindrical wall portion defining a longitudinal axis of said filter apparatus, said pressure vessel defining an internal space;
   providing a first annular filter and a second annular filter within said internal space, said second annular filter surrounding said first annular filter, said first annular filter and said second annular filter defining an annular particulate collection volume therebetween,
   directing a flow of said slurry into said particulate collection volume under sufficient pressure to force fluid to flow in a substantially radial direction through said first annular filter and through said second annular filter and any of said particulate matter blocking a filtering surface of said first annular filter and said second annular filter to substantially fill said particulate collection volume with particulate;

moving said first annular filter with respect to said second annular filter in a direction of said longitudinal axis upon completion of a filter cycle to allow said particulate to be emptied from said particulate collection volume.

2. The method of claim 1, wherein said pressure is at least 25 psi.

3. The method of claim 1, wherein a concentration of particulate matter in said slurry is greater than 1000 parts per million.

4. The method of claim 1, wherein a volume of said particulate collection volume is fixed during said filter cycle.

5. The method of claim 4, further comprising moving an annular scraper in a direction of said longitudinal axis relative to at least one of said first annular filter and said second annular filter to release said particulate matter from said particulate collection volume.

6. The method of claim 1, wherein moving said first annular filter comprises removing said first annular filter from said pressure vessel.

7. The method of claim 6, further comprising maintaining said second annular filter within said pressure vessel during said removing of said first annular filter from said pressure vessel.

8. The method of claim 1, further comprising spraying at least one of said first annular filter and said second annular filter with a wash liquid during said moving of said first annular filter.

9. The method of claim 8, wherein said spraying of at least one of said first annular filter and said second annular filter comprises spraying both of said first annular filter and said second annular filter.

10. A method of separating particulate matter from a slurry, comprising:

providing a filter apparatus comprising an annular inner filter, an outer filter surrounding said inner filter, said inner filter and said outer filter defining an annular particulate collection volume between them, said filter apparatus further comprising an outlet located downstream from said particulate collection volume and an inlet directing fluid into said particulate collection volume before said fluid passes through either of said inner filter and said outer filter;

initiating a filtering cycle comprising directing a flow of said slurry into said particulate collection volume under sufficient pressure to force fluid through said inner and outer filters and any of said particulate matter blocking a filtering surface of said inner and outer filters to substantially fill said particulate collection volume;

initiating a drive to move said inner filter and said outer filter axially with respect to one another upon completion of said filtering cycle to empty particulate from said particulate collection volume.

11. The method of claim 10, said filter further comprising a controller, said method further comprising initiating said drive with said controller.

12. The method of claim 10, further comprising providing at least one annular scraper sized and shaped such that axial movement of said inner filter and said outer filter with respect to one another causes said scraper to at least substantially remove particulate from said particulate collection volume.

13. The method of claim 10, further comprising spraying at least one of said inner and outer filters with a wash liquid during said axial movement of said inner filter and said outer filter with respect to one another.

* * * * *